(12) United States Patent
Morikawa et al.

(10) Patent No.: US 8,656,280 B2
(45) Date of Patent: Feb. 18, 2014

(54) DEVICE FOR ESTIMATING USER OPERATION INTENTION AND ELECTRONIC DEVICE USING THE SAME

(75) Inventors: Koji Morikawa, Kyoto (JP); Kazutoyo Takata, Osaka (JP)

(73) Assignee: Panasonic Corporation, Osaka (JP)

( * ) Notice: Subject to any disclaimer, the term of this patent is extended or adjusted under 35 U.S.C. 154(b) by 1363 days.

(21) Appl. No.: 12/088,128

(22) PCT Filed: Apr. 26, 2007

(86) PCT No.: PCT/JP2007/059032
§ 371 (c)(1),
(2), (4) Date: Mar. 26, 2008

(87) PCT Pub. No.: WO2007/148477
PCT Pub. Date: Dec. 27, 2007

(65) Prior Publication Data
US 2009/0265630 A1 Oct. 22, 2009

(30) Foreign Application Priority Data
Jun. 21, 2006 (JP) .................................. 2006-171770

(51) Int. Cl.
*G06F 3/00* (2006.01)
(52) U.S. Cl.
USPC ......................................... 715/708; 715/705
(58) Field of Classification Search
USPC .................................................. 715/708, 705
See application file for complete search history.

(56) References Cited

U.S. PATENT DOCUMENTS

| | | | | |
|---|---|---|---|---|
| 2001/0044791 | A1* | 11/2001 | Richter et al. | 707/2 |
| 2004/0006460 | A1* | 1/2004 | Katayama et al. | 704/10 |
| 2004/0145601 | A1* | 7/2004 | Brielmann et al. | 345/708 |
| 2005/0278093 | A1* | 12/2005 | Kameyama | 701/36 |

FOREIGN PATENT DOCUMENTS

| | | |
|---|---|---|
| JP | 06-149460 | 5/1994 |
| JP | 2000-163186 | 6/2000 |
| JP | 2003-345487 | 12/2003 |
| JP | 2005-352732 | 12/2005 |

OTHER PUBLICATIONS

International Search Report for corresponding Application No. PCT/JP2007/059032 dated Aug. 7, 2007.

* cited by examiner

*Primary Examiner* — Weilun Lo
*Assistant Examiner* — Dino Kujundzic
(74) *Attorney, Agent, or Firm* — Renner, Otto, Boisselle & Sklar, LLP

(57) ABSTRACT

There is provided an apparatus which provides manipulation assistance, even in the case where a user trying to executing a certain function has performed a wrong manipulation, by inferring the function which the user originally wanted to execute.

The apparatus according to the present invention is to be used in an electronic device having an input section to receive a manipulation by a user and operating based on the user's manipulation, and infers a manipulation intent of the user. This apparatus includes a storage which stores a database in which a function of the electronic device is associated with a manipulation that is highly mistakable when a user having an experience of manipulating an electronic device other than the electronic device uses the electronic device; and a manipulation assistance section for, when the manipulation by the user is wrong, determining a substance of manipulation assistance for executing a function which is intended by the user, in accordance with the function which is associated with the highly-mistakable manipulation in the database. This apparatus determines an operation of the electronic device based on the substance of manipulation assistance, and outputs an instruction to the electronic device.

16 Claims, 21 Drawing Sheets

FIG. 7

INTENDED-FUNCTION DB 80

| WRONG MANIPULATION BUTTON | INTENDED-FUNCTION CANDIDATE ||||
|---|---|---|---|---|
| | 1ST | 2ND | 3RD | ... |
| PLAY | PLAY DVD | PLAY SD | — | — |
| HDD | SELECT VIDEO 1 | RECORD TO HDD | RECORDING LIST | — |
| PROGRAM GUIDE | RECORDING LIST | RETURN TO TV | — | — |
| TV POWER | RETURN TO TV | — | — | — |
| RECORD | SCHEDULE A RECORDING | — | — | — |
| ... | | | | |

81 — WRONG MANIPULATION BUTTON
82 — INTENDED-FUNCTION CANDIDATE
83 — INTENDED-FUNCTION CANDIDATE LIST CORRESPONDING TO PLAY BUTTON

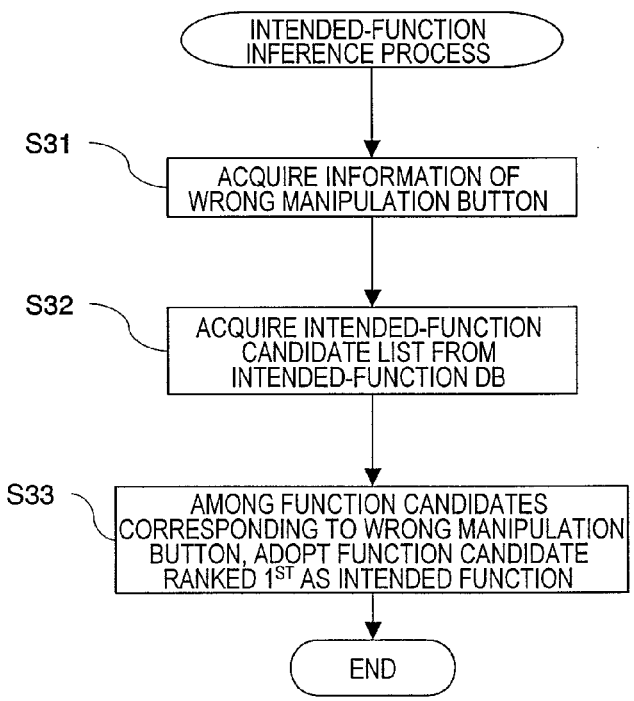

FIG. 8

INTENDED-FUNCTION INFERENCE PROCESS

S31 — ACQUIRE INFORMATION OF WRONG MANIPULATION BUTTON

S32 — ACQUIRE INTENDED-FUNCTION CANDIDATE LIST FROM INTENDED-FUNCTION DB

S33 — AMONG FUNCTION CANDIDATES CORRESPONDING TO WRONG MANIPULATION BUTTON, ADOPT FUNCTION CANDIDATE RANKED 1ST AS INTENDED FUNCTION

END

FIG.12

INTENDED-FUNCTION DB 80

| WRONG MANIPULATION BUTTON | INTENDED-FUNCTION CANDIDATE | | | | | |
|---|---|---|---|---|---|---|
| | 1ST | | 2ND | | 3RD | ... |
| | FUNCTION NAME | CERTAINTY LEVEL | FUNCTION NAME | CERTAINTY LEVEL | FUNCTION NAME | CERTAINTY LEVEL |
| PLAY | PLAY DVD | 0.9 | PLAY SD | 0.8 | — | — |
| HDD | SELECT VIDEO 1 | 0.5 | RECORD TO HDD | 0.3 | RECORDING LIST | 0.3 | — |
| PROGRAM GUIDE | RECORDING LIST | 0.7 | RETURN TO TV | 0.7 | — | — |
| TV POWER | RETURN TO TV | 0.5 | — | | — | — |
| RECORD | SCHEDULE A RECORDING | 0.5 | — | | — | — |
| ... | | | | | | |

FIG.13

| FUNCTION | ATTRIBUTE | | |
|---|---|---|---|
| | MANIPULATION G | FUNCTION SELECTION | MEDIA |
| PLAY DVD | PLAY | BUTTON | DVD |
| RECORDING LIST | RECORD | BUTTON | DVD/HDD |
| SCHEDULE A RECORDING | RECORD | GUI | DVD/HDD |
| NEXT CHAPTER | PLAY | BUTTON | DVD |
| ... | | | |

| FUNCTION (71) | TIME OF LAST EXECUTION (78) | ELAPSED TIME SINCE LAST EXECUTION (79) |
|---|---|---|
| PLAY DVD | FEBRUARY 26, 2006 11:24 | 2day 5h 36min |
| RECORDING LIST | FEBRUARY 28, 2006 13:52 | 0day 3h 8min |
| SCHEDULE A RECORDING | JANUARY 3, 2006 14:00 | 53day 3h 0min |
| NEXT CHAPTER | — | — |
| ... | ... | ... |

FIG.22

| WRONG MANIPULATION BUTTON | INTENDED-FUNCTION CANDIDATE | | | | | | |
|---|---|---|---|---|---|---|---|
| | 1ST | | 2ND | | 3RD | | ... |
| | FUNCTION NAME | MODEL NAME | FUNCTION NAME | MODEL NAME | FUNCTION NAME | MODEL NAME | |
| PLAY | PLAY DVD | ALL | PLAY SD | E95H | — | — | |
| HDD | SELECT VIDEO 1 | NO LEARNING | RECORD TO HDD | XS43 | RECORDING LIST | PSX | ... |
| PROGRAM GUIDE | RECORDING LIST | XS43 | RETURN TO TV | XS43 | — | — | |
| TV POWER | RETURN TO TV | NO LEARNING | — | | — | | |
| RECORD | SCHEDULE A RECORDING | PSX | — | | — | | |
| ... | | | | | | | |

FIG.23

| WRONG MANIPULATION BUTTON | INTENDED-FUNCTION CANDIDATE | | | | | | |
|---|---|---|---|---|---|---|---|
| | 1ST | | 2ND | | 3RD | | ... |
| | FUNCTION NAME | MODEL NAME | FUNCTION NAME | MODEL NAME | FUNCTION NAME | MODEL NAME | |
| PLAY | PLAY DVD | ALL | PLAY SD | E95H | — | — | |
| HDD | SELECT VIDEO 1 | NO LEARNING | RECORD TO HDD | XS43 | RECORDING LIST | PSX | ... |
| PROGRAM GUIDE | RECORDING LIST | XS43 | RETURN TO TV | XS43 | — | — | |
| TV POWER | RETURN TO TV | NO LEARNING | — | | — | | |
| RECORD | SCHEDULE A RECORDING | PSX | — | | — | | |
| ... | | | | | | | |

FIG.26

| | | panasonic E95H | |
|---|---|---|---|
| | QUESTION | STATUS BEFORE MANIPULATION (E95H) | ANSWER (E95H) |
| Q1. | POWER ON TELEVISION SET. | TELEVISION SCREEN: off<br>DVD MACHINE: off | TV POWER |
| Q2. | SWITCH TELEVISION INPUT TO VIDEO 1. | TELEVISION SCREEN: on<br>DVD MACHINE: off | TV INPUT |
| Q3. | POWER ON DVD RECORDER. | TELEVISION SCREEN: VIDEO 1 SCREEN<br>DVD MACHINE: HDD MODE | DVD POWER |
| Q4. | DISPLAY CHANNEL 8. | TELEVISION SCREEN: VIDEO 1 SCREEN<br>DVD MACHINE: HDD MODE | 8 |
| Q5. | WORLD HERITAGE DVD-ROM IS ALREADY IN. PLAY THIS DVD-ROM. | TELEVISION SCREEN: CHANNEL 8<br>DVD MACHINE: HDD MODE | DVD⇒PLAY |
| Q6. | STOP. | TELEVISION SCREEN: WORLD HERITAGE BEING PLAYED BACK<br>DVD MACHINE: PLAYBACK DISPLAY | STOP |
| Q7. | DISPLAY CHANNEL 6. | TELEVISION SCREEN: DVD BACKGROUND<br>DVD MACHINE: DVD MODE | HDD⇒6 |
| Q8. | RECORD CURRENTLY DISPLAYED PROGRAM TO HDD (HARD DISK). | TELEVISION SCREEN: CHANNEL 6<br>DVD MACHINE: HDD MODE | RECORD |
| Q9. | STOP RECORDING. | TELEVISION SCREEN: CHANNEL 6<br>DVD MACHINE: RECORDING LAMP ON | STOP |
| Q10. | DISPLAY LIST OF PROGRAMS RECORDED ON HDD (HARD DISK). | TELEVISION SCREEN: CHANNEL 6<br>DVD MACHINE: HDD MODE | PROGRAM NAVI |
| Q11. | SELECT BASEBALL FROM PROGRAM LIST. | TELEVISION SCREEN: PROGRAM NAVI<br>DVD MACHINE: HDD MODE | CURSOR ⇒SELECT BASEBALL |
| Q12. | PLAY BACK SELECTED BASEBALL PROGRAM. | TELEVISION SCREEN: PROGRAM NAVI<br>DVD MACHINE: HDD MODE | PLAY OR ENTER |
| Q13. | PLAY BACK NEXT CHAPTER. | TELEVISION SCREEN: PLAYBACK SCREEN<br>DVD MACHINE: HDD MODE | SKIP |
| Q14. | STOP. | TELEVISION SCREEN: PLAYBACK SCREEN<br>DVD MACHINE: HDD MODE | STOP |
| Q15. | SELECT VOLLEYBALL FROM PROGRAM LIST. | TELEVISION SCREEN: PROGRAM NAVI<br>DVD MACHINE: HDD MODE | CURSOR⇒SELECT VOLLEYBALL |
| Q16. | SELECTED VOLLEYBALL PROGRAM IS TO BE ERASED. DISPLAY ERASE SCREEN. | TELEVISION SCREEN: PLAYBACK SCREEN<br>DVD MACHINE: HDD MODE | SUBMENU⇒TITLE ERASE⇒ENTER |
| Q17. | CANCEL PROGRAM ERASURE. | TELEVISION SCREEN: ERASE SCREEN<br>DVD MACHINE: HDD MODE | SELECT CANCEL⇒ENTER |
| Q18. | RETURN TO TELEVISION SCREEN. | TELEVISION SCREEN: PROGRAM NAVI<br>DVD MACHINE: HDD MODE | PLAYBACK NAVI OR RETURN |
| Q19. | DISPLAY PROGRAM GUIDE. | TELEVISION SCREEN: CHANNEL 6<br>DVD MACHINE: HDD MODE | PROGRAM GUIDE |
| Q20. | SCHEDULE A RECORDING OF CURRENTLY SELECTED PROGRAM. | TELEVISION SCREEN: PROGRAM GUIDE<br>DVD MACHINE: HDD MODE | ENTER |

FIG. 28

FUNCTION 123   CORRECT MANIPULATION 122   RATE OF CORRECTNESS 120   MANIPULATION INFORMATION 121

MANIPULATION RESULTS OF EH60

| QUESTION | FUNCTION | CORRECT MANIPULATION | RATE OF CORRECTNESS | | | | E95H | | | PSX | | | XS43 | | | NO LEARNING | |
|---|---|---|---|---|---|---|---|---|---|---|---|---|---|---|---|---|---|
| | | | E95H | PSX | XS43 | NO LEARNING | P1 | P2 | P3 | P4 | P5 | P6 | P7 | P8 | P9 | P10 | P11 |
| Q1 | TV POWER ON | TV POWER | 1.0 | 1.0 | 1.0 | 1.0 | | | | | | | | | | | |
| Q2 | TV INPUT SWITCHING | TV INPUT | 1.0 | 1.0 | 1.0 | 0.7 | | | | | | | | | | HDD | |
| Q3 | DVD POWER ON | DVD POWER | 1.0 | 1.0 | 1.0 | 1.0 | | | | | | | | | | | |
| Q4 | SELECT CHANNEL 8 | 8 | 1.0 | 1.0 | 1.0 | 1.0 | | | | | | | | | | | |
| Q5 | SELECT DVD | DVD | 1.0 | 1.0 | 1.0 | 0.7 | | | | | | | | | | PLAY | |
| Q6 | STOP | STOP | 1.0 | 1.0 | 1.0 | 1.0 | | | | | | | | | | | |
| Q7 | SELECT HDD | HDD | 1.0 | 0.0 | 0.0 | 0.0 | | | | 6 | 6 | 6 | 6 | 6 | 6 | 6 | 6 |
| Q8 | RECORD | RECORD | 1.0 | 1.0 | 0.7 | 1.0 | | | | | | HDD | | | | | |
| Q9 | STOP | STOP | 1.0 | 1.0 | 1.0 | 1.0 | | | | | | | | | | | |
| Q10 | SHOW RECORDING LIST | PROGRAM NAVI | 1.0 | 0.0 | 0.0 | 0.7 | | | | HDD | HDD | PROGRAM GUIDE | PROGRAM GUIDE | PROGRAM GUIDE | PROGRAM GUIDE | | |
| Q11 | SELECT | CURSOR/ JOG DIAL | 1.0 | 1.0 | 0.7 | 1.0 | | | | | | | FUNCTION SELECT | | | | |
| Q12 | PLAYBACK | PLAYBACK/ENTER | 1.0 | 1.0 | 1.0 | 1.0 | | | | | | | | | | | |
| Q13 | SKIP | SKIP | 1.0 | 1.0 | 0.7 | 0.7 | | | | | | | | | CURSOR RIGHT | | |
| Q14 | STOP | STOP | 1.0 | 1.0 | 1.0 | 1.0 | | | | | | | | | | | |
| Q15 | SELECT | CURSOR/ JOG DIAL | 1.0 | 0.0 | 0.7 | 1.0 | | | | | | | FUNCTION SELECT | FUNCTION SELECT | | | |
| Q16 | ERASE PROGRAM | SUB MENU/ ERASE | 1.0 | 1.0 | 0.7 | 1.0 | | | | | | | | | | | |
| Q17 | SELECT | ENTER | 1.0 | 1.0 | 1.0 | 1.0 | | | | | | | | | 11 | | |
| Q18 | RETURN | PLAYBACK NAVI/RETURN | 0.7 | 0.5 | 0.7 | 0.3 | | | | | 1 | | | PROGRAM GUIDE | TV POWER | DVD POWER | |
| Q19 | PROGRAM GUIDE | PROGRAM GUIDE | 1.0 | 1.0 | 1.0 | 1.0 | | | | | | | RECORDING MODE | | | RECORDING MODE | |
| Q20 | SCHEDULE A RECORDING | ENTER | 1.0 | 0.0 | 0.7 | 0.0 | | | HDD | CHECK SCHEDULE | RECORD | | | | | | CHECK SCHEDULE |

FIG.29

| WRONG MANIPULATION BUTTON | FUNCTION MEANT TO BE EXECUTED | | |
|---|---|---|---|
| HDD | TV INPUT SWITCHING (Q2) | RECORD (Q8) | SHOW RECORDING LIST (Q10) |
| PROGRAM GUIDE | SHOW RECORDING LIST (Q10) | RETURN (Q18) | |
| FUNCTION SELECT | SELECT (Q11) | ERASE PROGRAM (Q16) | |
| ... | | | |

DEVICE FOR ESTIMATING USER OPERATION INTENTION AND ELECTRONIC DEVICE USING THE SAME

TECHNICAL FIELD

The present invention relates to a technique of providing manipulation assistance for a device. More specifically, the present invention relates to a technique of, when a manipulation performed by a user who believed it to be proper for executing a desired function of a device is wrong, inferring a function which the user wanted to execute, thus realizing manipulation assistance for the device.

BACKGROUND ART

As methods of inferring a user's intent in device manipulation, conventionally, a method of inferring the intent by utilizing a manipulation history of the user, a method of inferring the intent by utilizing the behavior and state of the user, and the like are known.

For example, Patent Document 1 discloses a device function executing apparatus which utilizes a manipulation history of the user. This function executing apparatus operates based on the premise that a function which is performed immediately after a wrong manipulation is highly likely to be the function which the user tried to execute upon the wrong manipulation. The function executing apparatus includes a wrong manipulation chronicling section which stores information such as the substance of wrong manipulations, the number of instances of wrong manipulations, functions which were executed immediately after the wrong manipulations, and the like. When a user performs a wrong manipulation, the function executing apparatus reads from the wrong manipulation chronicling section a function which was executed immediately after the wrong manipulation, and, on behalf of the user, executes it as the function which the user intended to execute. With such an operation of the apparatus, as for the wrong manipulations which each individual user is liable to perform, the user is freed from the task of correcting the wrong manipulation.

On the other hand, Patent Document 2, for example, discloses a control apparatus for automobiles which infers a user's intent by utilizing the behavior and state of the user. An intent determination section which is incorporated in this control apparatus for automobiles includes means for storing information indicating correlations between the actions/status of a user that can be acquired by using a camera or a microphone and the user's intents. The stored information is a table composed of a plurality of first entries indicating the actions/status of the user and a plurality of second entries indicating the user's intents, and the degree of correlation between each first entry and each second entry is indicated by a numerical value. As the numerical value becomes greater, a higher priority level is prescribed. By inferring intent based on this information, it is possible to infer the user's intent from the actions/status of the user, even if the user does not perform a manipulation of executing the function. Because of the ability to make intent inferences from a plurality of pieces of information, an autonomous manner of function control is provided.

Furthermore, Patent Document 2 discloses, when the autonomous function control fails to properly operate, changing a weighting in order to change its priority level, by utilizing a cancellation manipulation by the user.

[Patent Document 1] Japanese Laid-Open Patent Publication No. 6-149460

[Patent Document 2] Japanese Laid-Open Patent Publication No. 2005-352732

DISCLOSURE OF INVENTION

Problems to be Solved by the Invention

The conventional methods have problems in that, although it is possible to infer a user's intent with respect to any function that has once been executed by that user, those functions which have never been executed do not permit intent inferences. The reason is that the conventional methods record data of instances of wrong manipulations by the user, and if a similar situation occurs in the future, such data is utilized for making intent inferences. When the user has performed a wrong manipulation for the first time, or encounters an incorrect behavior of the device due to an incorrect intent inference, the user himself/herself merely lets the device know that the user's intent is not reflected, and no manipulation assistance is provided from the device, so that the user is compelled to look for the proper manipulation method based on trial and error.

Specifically, according to the method of Patent Document 1, storing the functions which are executed immediately after wrong manipulations makes it possible to provide assistance for those wrong manipulations which a user is liable to repeat, but it is impossible to provide manipulation assistance with respect to the user's first wrong manipulation. Moreover, since manipulation assistance is not provided at first, if the user makes a mistake in executing an intended function, not only the user needs to look for a proper manipulation method of the function to be executed based on trial and error, but also there is no guarantee that the manipulation immediately after the user has performed a wrong manipulation is the proper manipulation.

Similarly, according to the method of Patent Document 2, if a user gives a signal that an autonomous control by the device is not correct, priority level adjustments or the like are made so as to improve the accuracy of intent inferences in the future for enabling proper inferences for the next time and afterwards. However, even if the user indicates his or her dissatisfaction to the device, such will merely be reflected in the next device operation and afterwards, and it is still impossible to infer the function which user wants to execute at that point in time.

Information communication devices and audio-visual devices of the recent years are equipped with very many functions, and therefore many different manipulation intents are expectable for any situation that bears similarity to those in the past. Thus, precise intent inferences will not be made possible just by a rule which associates the states or the like of the user with his or her intents.

Moreover, in its nature, device manipulation assistance is not necessary when a proper manipulation is being performed by the user. Once the user fails to perform a proper manipulation and ends up with a wrong manipulation, e.g., when attempting for the first time a function that has never been executed before and resulting in a wrong manipulation, then a precise device manipulation assistance becomes necessary.

An objective of the present invention is to, in a device with many functions, provide assistance for a device manipulation by inferring a function which the user originally wanted to execute, even in the case where the user has performed the wrong manipulation for the first time with respect to a given function.

Means for Solving the Problems

An electronic device according to the present invention is an electronic device having an input section to receive a manipulation by a user and operating based on the manipulation, comprising: a storage section which stores a database in which a function of the electronic device is associated with a manipulation that is highly mistakable when a user having an experience of manipulating an electronic device other than the electronic device uses the electronic device; a processing section for, when the manipulation by the user is wrong, generating manipulation assistance information in accordance with the function which is associated with the highly-mistakable manipulation in the database; and an output section for outputting a signal for presenting the manipulation assistance information. The processing section executes a function in accordance with a manipulation which is received in response to the presentation of the manipulation assistance information.

An apparatus for inferring manipulation intent of a user is to be used in an electronic device having an input section to receive a manipulation by a user and operating based on the manipulation. The apparatus comprises: a storage section which stores a database in which a function of the electronic device is associated with a manipulation that is highly mistakable when a user having an experience of manipulating an electronic device other than the electronic device uses the electronic device; and a manipulation assistance section for, when the manipulation by the user is wrong, determining a substance of manipulation assistance for executing a function which is intended by the user, in accordance with the function which is associated with the highly-mistakable manipulation in the database, wherein, the apparatus for inferring manipulation intent determines an operation of the electronic device based on the substance of manipulation assistance, and outputs an instruction to the electronic device.

The apparatus may further comprise an update section for updating the database depending on whether the manipulation is wrong or not.

When the manipulation is proper, the update section may update the database based on information of a function candidate which is identical to the function corresponding to the manipulation.

The database may retain a set in which information of at least one function is associated with a numerical value corresponding to the at least one function.

The apparatus may further comprise an inference section for, when the manipulation by the user is wrong, selecting the at least one function based on the size of the numerical value, wherein, in accordance with the at least one selected function, the manipulation assistance section may determine the substance of manipulation assistance for executing the function which is intended by the user.

The database may retain a plurality of sets in which information of a plurality of functions is associated with numerical values respectively corresponding to the plurality of functions; and the numerical values may be assigned in accordance with closeness between a function which is desired by the user who has performed the highly-mistakable manipulation and each of the plurality of functions.

At least one attribute may be assigned in advance to each of the plurality of functions; and when the manipulation is proper, the update section may search the database based on an attribute of a first function that corresponds to the manipulation, identify a second function to which the same attribute is assigned, and change the numerical value corresponding to the second function.

The database may retain a set in which information of at least one function is associated with information of a device group concerning a model of the other electronic device; and when the manipulation is wrong, the update section may update the database based on information of the model.

The apparatus may further comprise an inference section for identifying the device group based on information of a device group of the set corresponding to the wrong manipulation.

The database may retain a plurality of said sets; and the update section deletes any set that does not contain information of the identified device group.

A plurality of said device groups may be defined, each device group being defined based on a system of manipulations which is common to a plurality of models.

A plurality of said device groups may be defined, each device group being defined based on a system of manipulations of one model.

Effects of the Invention

An apparatus according to the present invention includes a database in which each function of an electronic device is associated with a manipulation that is highly mistakable when a user having an experience of manipulating an electronic device other than the electronic device uses the electronic device. When a manipulation by the user is wrong, a function that is associated with a highly-mistakable manipulation in the database is listed as a candidate function which was intended by the user, and determines a substance of manipulation assistance for executing that function. The operation of the electronic device is determined based on a manipulation of the user made in response to a presentation of the manipulation assistance substance.

In particular, an intended-function DB is updated based on the user's history of use concerning proper manipulations, whereby ranks of intended-function candidates are changed. Thus, the ranks of the candidates are determined so as to reflect the user's knowledge. As a result, when the user has performed a wrong manipulation, the function which the user originally wanted to execute can be accurately inferred, thus enabling manipulation assistance for the device.

BRIEF DESCRIPTION OF DRAWINGS

[FIG. 7] A diagram showing an exemplary data structure of an intended-function DB 80 which is obtained through recompilation.

[FIG. 8] A flowchart showing a processing procedure by an inference section 30.

[FIG. 12] A diagram showing an exemplary data structure of an intended-function DB 80 with certainty levels.

[FIG. 13] A diagram showing an attribute list of functions related to the second process.

[FIG. 22] A diagram showing an exemplary data structure of an intended-function DB 80 according to a fourth embodiment.

[FIG. 23] A diagram showing an example of updating the intended-function DB 80.

[FIG. 26] A diagram showing an example of a question paper with an answer key, used by an examinee for learning.

[FIG. 28] A diagram showing exemplary experimental results according to an experimental procedure.

[FIG. 29] A diagram showing some of the results of ascertaining the wrong manipulation probability of each piece of manipulation information based on experimental results.

DESCRIPTION OF THE REFERENCE NUMERALS

Figure 1:
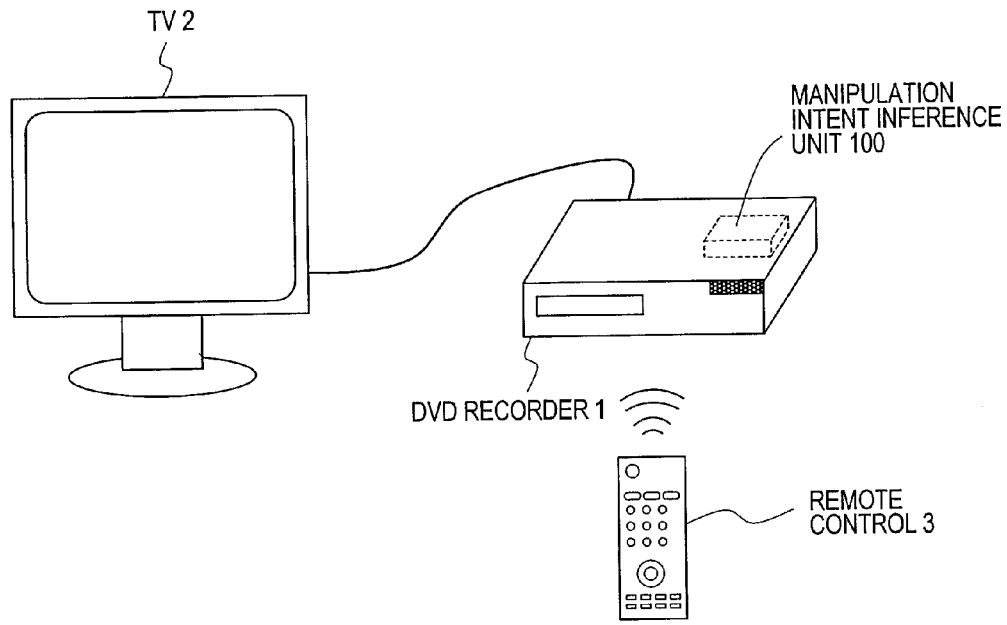
[FIG. 1] A diagram showing the constitution of an environment in which a DVD recorder 1 is used.

| | DESCRIPTION OF THE REFERENCE NUMERALS |
|---|---|
| 1 | DVD recorder |
| 2 | TV |
| 3 | remote control |
| 10 | input section |
| 20 | wrong manipulation determination section |
| 30 | intended-function inference section |
| 40 | manipulation assistance section |
| 50 | control section |
| 60 | output section |
| 70 | intended-function DB update section |
| 80 | intended-function DB |
| 100 | manipulation intent inference unit |
| 110 | CPU |
| 112 | database storage section |

BEST MODE FOR CARRYING OUT THE INVENTION

Hereinafter, with reference to the attached drawings, embodiments of an electronic device and a manipulation intent inference apparatus to be provided in an electronic device according to the present invention will be described.

First, the operation principles of a manipulation intent inference apparatus according to the present embodiment will be described. The manipulation intent inference apparatus includes an intended-function database. In this database, which is generated based on experimental results, functions of an electronic device are associated with manipulations which are highly mistakable when those functions are executed.

For example, assume that an experimental result indicates that many of a plurality of users wanting to execute a certain function have performed the same manipulation by mistake. This result leads to the inference that, when this manipulation is performed, the user is likely to have wanted to execute this certain function. In the database, this manipulation is associated with the function. One or a plurality of candidate function(s) may exist for any given manipulation. Thus, it can be said that, in the intended-function database, highly-mistakable manipulations to the user are associated with functions of the electronic device.

When the user has made a manipulation mistake, the manipulation intent inference apparatus refers to the intended-function database to retrieve those candidates corresponding to the manipulation (intended-function candidates) which have a high rank (e.g., the highest rank), because this function is inferred to be the function which the user originally wanted to perform. By providing manipulation assistance to the user based on this function candidate, even if it is a function which was tried by the user for the first time, it is possible to present a precise candidate of the function, according to the substance of the wrong manipulation.

On the other hand, if the user has performed a proper manipulation, modifications are performed in accordance with the substance of the properly-performed manipulation, e.g., lowering the rank of the intended-function candidate in the intended-function database. As the user continues use, those intended-function candidates which conform to the user's knowledge will always be among the higher ranks of intended-function candidates, so that the accuracy of manipulation assistance at the time of a wrong manipulation will be increased.

In the following, manipulation experiments which were conducted by the inventors will be described by first referring to FIG. 24 to FIG. 29 to describe the basis of the principles of the present invention in detail. Thereafter, by referring to FIG. 1 to FIG. 23, embodiments of the present invention will be described in detail.

1. Descriptions of a Preliminary Experiment for Manipulation Intent Inference

The inventors have conducted a preliminary experiment for manipulation intent inference. The aim of this experiment is to demonstrate that a user's manipulation result is deeply related to a function which the user originally wanted to execute.

In this experiment, changes in the rate of correctness were observed regarding remote control manipulations for a DVD recorder which was an evaluation subject, under conditions where manipulation learning had been performed in advance for a device which was not the evaluation subject. The examinees were divided into a group who learned manipulations of the functions of the DVD recorders and a group who did not do such learning. The group who did the learning learned in advance the device manipulations of one model among the four aforementioned DVD recorders, and took a manipulation test of 20 questions using the other three models. On the other hand, the group who did not do the learning did not learn about any of the models, but took a manipulation test of 20 questions for the four DVD recorders, similarly to the group who did the learning. Through a comparison of the rate of correctness with respect to each model for manipulation learning, it was confirmed that different manipulations could be induced for the same manipulation question regarding the same device, depending on differences in the device on which manipulation learning was performed in advance. This result indicates that a device which was previously being used is inferable from the correctness or incorrectness of button manipulations, and that once the device which was previously being used is inferred, the button manipulations that are susceptible to wrong manipulations, which differ from user to user, will be predictable even with respect to those button manipulations which are performed for the first time.

2. DVD Recorder Manipulation Experiment

The aim of this experiment is to observe changes in the rate of correctness in a DVD remote control manipulation test, under conditions where device manipulations had been learned in advance.

To conduct the experiment, 15 examinees, who were college students, were provided with four DVD recorders differing in their systems of manipulation and respective interfaces of remote controls, GUIs, device indications, and the like. The four were: DMR-EH60 (Panasonic), DMR-E95H (Panasonic), PSX DESR-7700 (Sony), and RD-XS43 (Toshiba). None of the examinees owned DVD recorders, and did not know any specific manipulation methods in the beginning.

Figure 24:
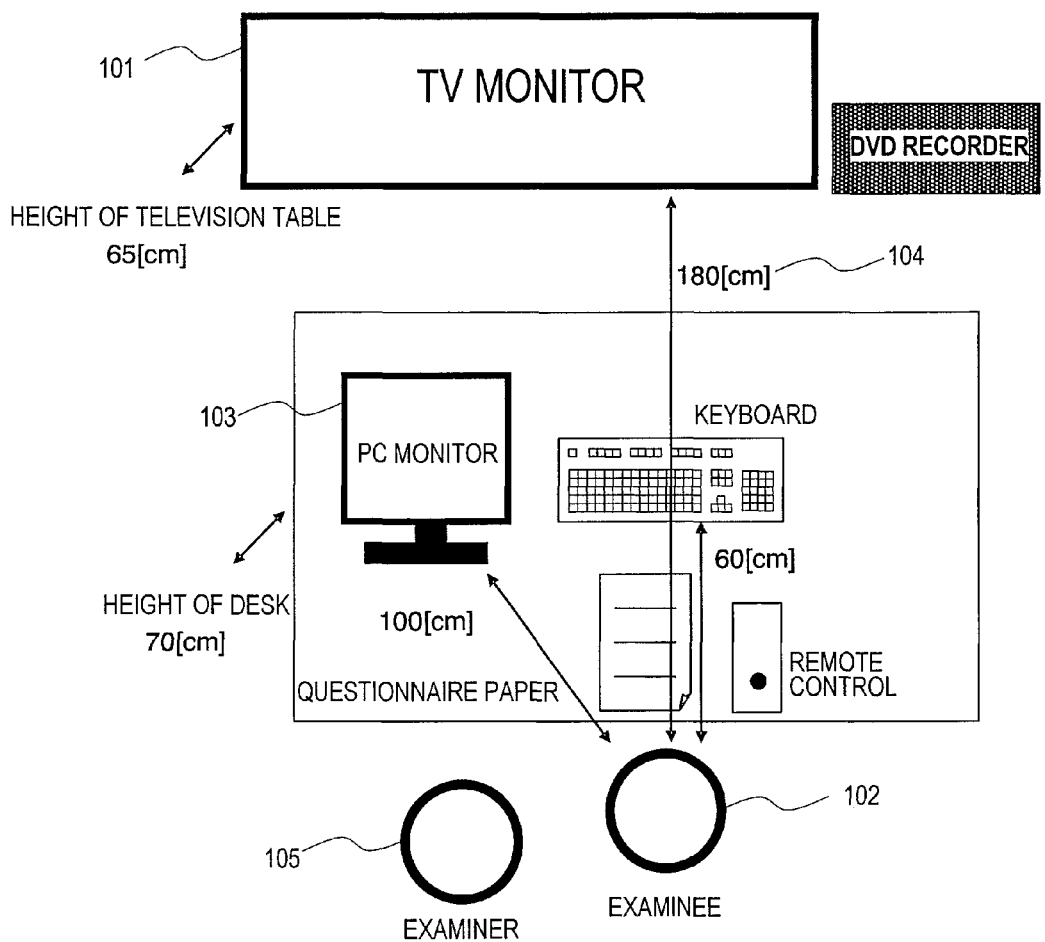
[FIG. 24] A diagram showing positioning of experimental equipment.

FIG. 24 shows positioning of experimental equipment. A television set 101 is TH-36DH200 (Panasonic). The television set 101 is provided in order to display manipulation results of the remote control. A PC monitor 103 is a Flex Scan L685 17-inch liquid crystal display (EIZO). The PC monitor 103 is provided in order to present test questions to an examinee 102.

A distance 104 between the examinee 102 and the television screen 101 was 180 cm, which was decided as the natural distance for usually watching television at home. Moreover, in order to present questions to the examinee 102 and to conduct device manipulations, an examiner 105 was on stand-by behind the examinee 102.

Figure 25:
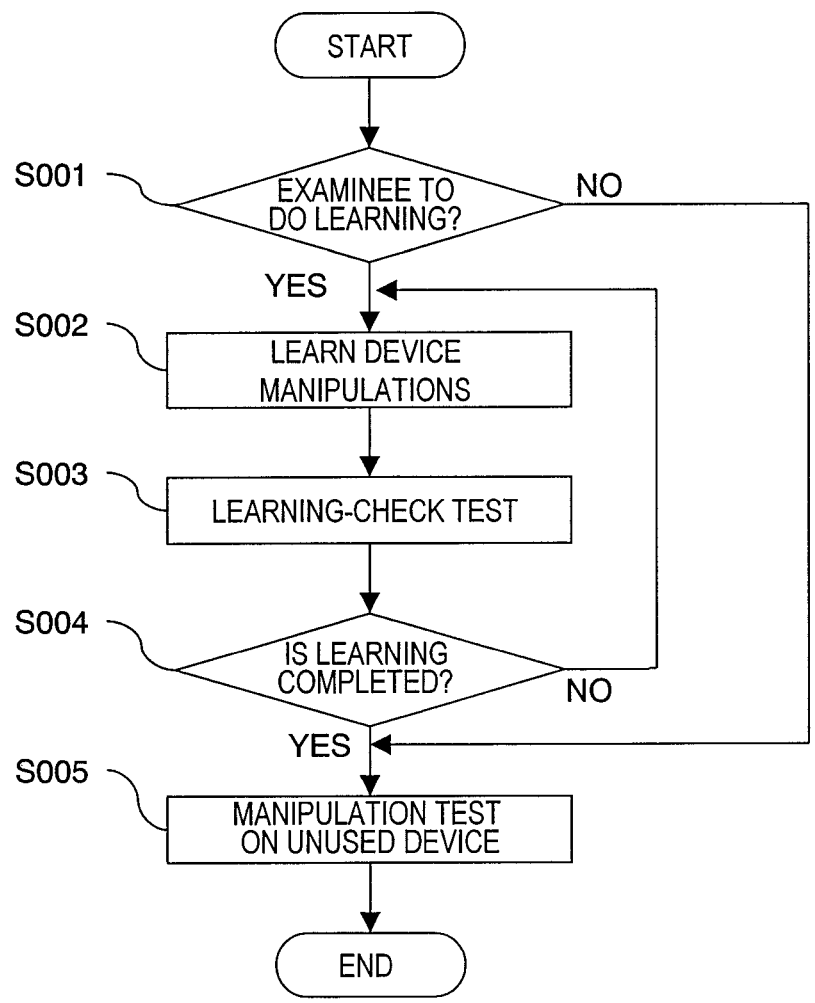
[FIG. 25] A flowchart showing a procedure of a manipulation experiment.

FIG. 25 shows a procedure of the manipulation experiment. At step S001, a determination is made between an examinee who is to do learning and an examinee who is not to do learning. In this experiment, 12 out of the 15 examinees were permitted learning, whereas the other 3 examinees were not permitted learning.

At step S002, an examinee who was determined at step S001 to do learning was allowed to learn the manipulations of one DVD recorder. The twelve were divided into 4 groups each consisting of three, and each group was allowed to learn about either one of DMR-EH60, DMR-E95H, PSX DESR-7700, or RD-XS43.

FIG. 26 shows an example of a question paper with an answer key, used by the examinee for learning. The question paper describes which manipulation should be performed in which status, in realizing a given status. As the learning method, a method was used where the question paper with an answer key shown in FIG. 26 was given to the examinee, and the examinee was allowed to freely do learning while actually performing remote control manipulations for the DVD recorder. The learning time was 20 minutes.

At step S003, a learning-check test was performed for the examinees who did learning at step S002. As the test method, a method was used where: the same questions as those used for the learning at step S002 were consecutively output on the PC monitor 103 shown in FIG. 24; the examinee would press a button on the remote control in response to each question; and the result of correctness or incorrectness of the press manipulation was recorded by the examiner.

Referring back to FIG. 25, at step S004, it was determined whether those examinees who did learning at step S003 had completed learning. As the determination method, completion of learning was determined when the results of the learning-check test performed at step S003 were all correct. On the other hand, if not all of the results of the learning-check test were correct, incompletion of learning was determined, and control returned to step S002 to allow a second chance of learning.

At step S005, a manipulation test of evaluation subject devices was conducted for those examinees whose learning was determined to have been completed at step S004, and those examinees who were determined at step S001 not to do learning. For any examinee whose learning was determined to have been completed at step S004, a manipulation test was performed by using as the evaluation subject devices the three other DVD recorders that were not used for the learning. For any examinee who was determined at step S001 not to do learning, a manipulation test was performed by using all of the four devices as the evaluation subject devices. As the manipulation test, the same questions as the questions used at step S003 were used.

Figure 27:
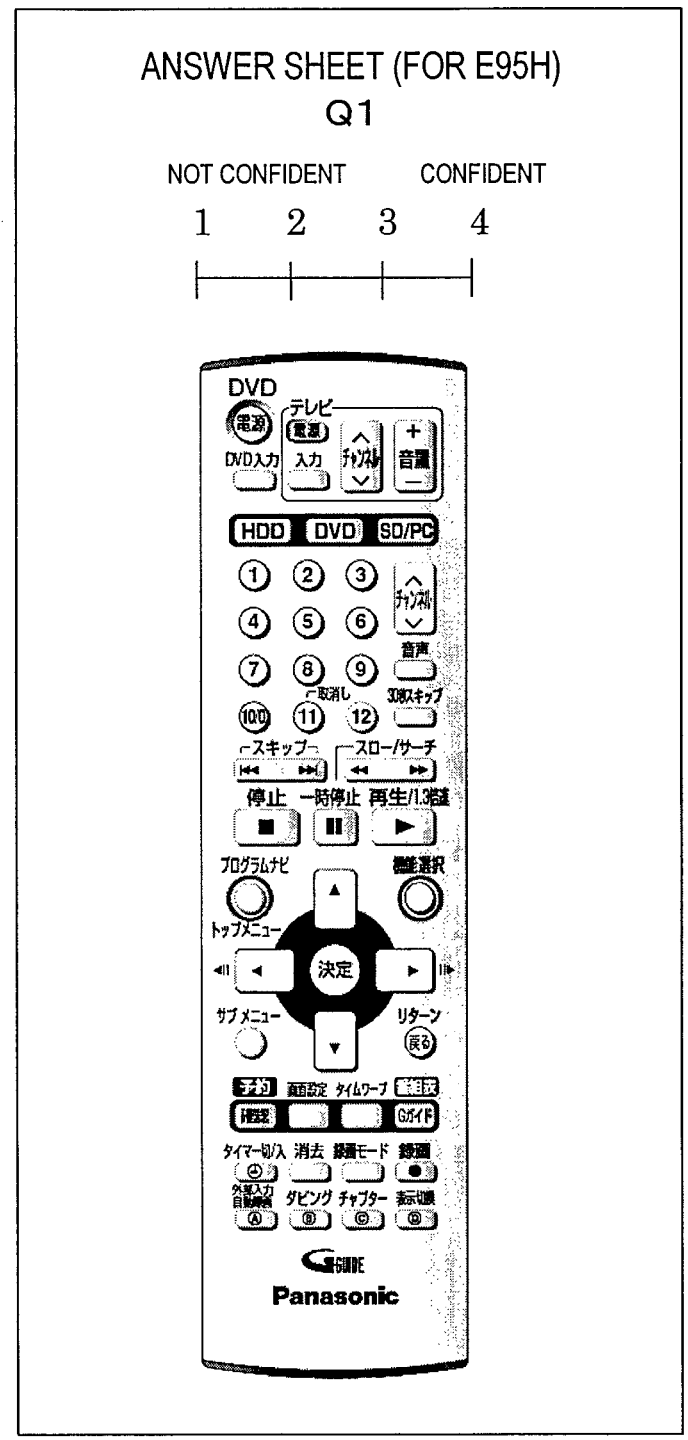
[FIG. 27] A diagram showing an example of an answer sheet.

FIG. 27 shows an example of an answer sheet. As the answering method, a method was used where, after each question was displayed on the PC monitor 103, a certainty level regarding the answer to that question was first written down, and thereafter the examinee made a sign around the remote control button on the answer sheet that was believed to be correct. Since the examinee would write the answer on paper, instead of actually performing a remote control manipulation, the operation results of the device based on the manipulation results would not be known to the examinee. Thus, it was ensured that the manipulation knowledge regarding the evaluation subject device would not change because of the operation results of the device responsive to the user's device manipulations, thus allowing each question on each model to be evaluated in direct comparison based solely upon differences in the conditions of learning in advance.

FIG. 28 shows exemplary experimental results according to the above procedure. FIG. 28 is a list of results, showing: rate of correctness 120, which indicates the rate of correctness of each learning group with respect to each question when using EH60; and manipulation information 121 of the user. The "manipulation information" is information of an input manipulation as acquired from the user.

Function 123 in the table represents a function of the DVD recorder corresponding to each question. Correct manipulation 122 represents a correct manipulation for executing the function. The manipulation information 121 in the table describes a manipulation result by each examinee, from examinees P1 to P11. Any blank in the table indicates that the examinee has performed the correct manipulation (i.e., the manipulation of the correct manipulation 122 in the table). Any non-blank portion represents a wrong manipulation, and also indicates which manipulation has resulted in a mistake. For example, "HDD" indicates that pressing the HDD button to execute a certain function resulted in a wrong manipulation.

It can be seen from FIG. 28 that, in the presence of different users, wrong manipulations may occur for a number of functions, and that the same wrong manipulation button may be pressed with the desire to execute different functions. For example, the "HDD" button is pressed by examinee P10 wanting to execute TV input switching (Q2), and by examinee P6 wanting to execute recording (Q8). Thus, the functions which may originally have been meant to be executed when "HDD" was pressed can be narrowed down to several candidates.

Now, in the actual device manipulation, what is obtained from the user is a button manipulation on the remote control, which is not always identical to the function that was meant to be executed. In other words, from the button manipulation information alone, it cannot be determined whether the user has pressed the button as the intended function or the user has pressed the wrong button in order to realize an intended function. Therefore, even by using the above-described database as it is, which is in function-by-function form, the user's button manipulation alone does not make it possible to predict any function that is likely to result in a wrong manipulation or a function which was originally meant to be executed.

Therefore, the above experimental results were studied on a wrong manipulation button-by-wrong manipulation button basis, instead of question by question. FIG. 29 shows some of the results of ascertaining the wrong manipulation candidates for each piece of manipulation information, based on the experimental results. "HDD" etc. are manipulation information corresponding to manipulation button names 33. A "wrong manipulation candidate" is a candidate of a function that was meant to be executed in the case where the manipulation information having been input by the user results in a wrong manipulation. For example, in the case where pressing the "HDD" button has resulted in a mistake, the user may originally have wanted to execute TV input switching of Q2, or recording of Q8, or show recording list of Q10. Through such compilation, the information as to which button has been pressed to result in a wrong manipulation becomes usable as information with which to infer the function which was originally meant to be executed.

Furthermore, another tendency is also observed when looking at the experimental results of FIG. 28 with respect to each examinee. For example, it is conceivable that examinee P10 mainly lacks understanding as to selection manipulation, such as TV input switching of Q2, select DVD of Q5, and select HDD of Q7. Moreover, examinee P5 makes mistakes as to select HDD of Q7, show recording list of Q10, and schedule a recording of Q20, which indicates an inability of this examinee to properly perform manipulations concerning recording. This makes it presumable that each examinee has his or her own combination of manipulations to be mistaken. That is, when a mistake occurs as to one function, it means that other highly-mistakable functions may exist.

In summary of the above, the three following pieces of knowledge were obtained from this experiment.
1. Based on which button was pressed to result in a mistake, it is possible to narrow down on the function which was originally meant to be executed.
2. Based on which button was pressed to result in a mistake, it can be known as to which other functions are susceptible to wrong manipulations.
3. Based on which button was pressed to result in a mistake, it is also possible to infer which device the current user was previously using.

From the above knowledge, based on previous experimental results or experience of device designing, advance preparations may be made that are directed to, when a user has performed a wrong manipulation in connection with a given button, the candidates of functions that may originally have been meant to be executed with the wrong manipulation button. As a result, it becomes possible to narrow down the function candidates that the user has originally wanted to perform. Furthermore, by also taking into consideration a manipulation history of the user, further screening of highly-mistakable function candidates becomes possible, as will be clarified in the descriptions of the following embodiments.

3. Descriptions of Embodiments of the Present Invention

Before describing the respective embodiments, by first referring to FIG. 1 and FIG. 2, a manipulation intent inference apparatus (unit) according to the present invention as well as an environment in which an electronic device incorporating the apparatus is to be used will be described. In the following descriptions, the electronic device is assumed to be a DVD recorder.

FIG. 1 shows the constitution of an environment in which a DVD recorder 1 according to the present embodiment is used. The DVD recorder 1 has the function of recording broadcast programs onto a DVD (not shown), and playing back broadcast programs which are recorded on a DVD. The video and audio that has been played back is displayed on the screen of a TV 2 and is output through the loudspeakers. The user utilizes a remote control 3 and buttons on the main housing (not shown) to manipulate the DVD recorder 1, thus being able to execute various functions of the DVD recorder 1.

The DVD recorder 1 incorporates a manipulation intent inference unit 100. As will be described later, the manipulation intent inference unit 100 (hereinafter referred to as the "inference unit 100") includes: a storage section for storing a database in which functions of the electronic device are associated with highly-mistakable manipulations to the user; and a manipulation assistance section for, if a manipulation by the user is wrong, determining a substance of manipulation assistance for executing a function that was intended by the user, according to the functions which are associated with the highly-mistakable manipulations in the database. Based on this substance of manipulation assistance, the inference unit 100 determines an operation of the electronic device, and instructs the electronic device to present manipulation assistance information based on the user's manipulation or the like.

Figure 2:
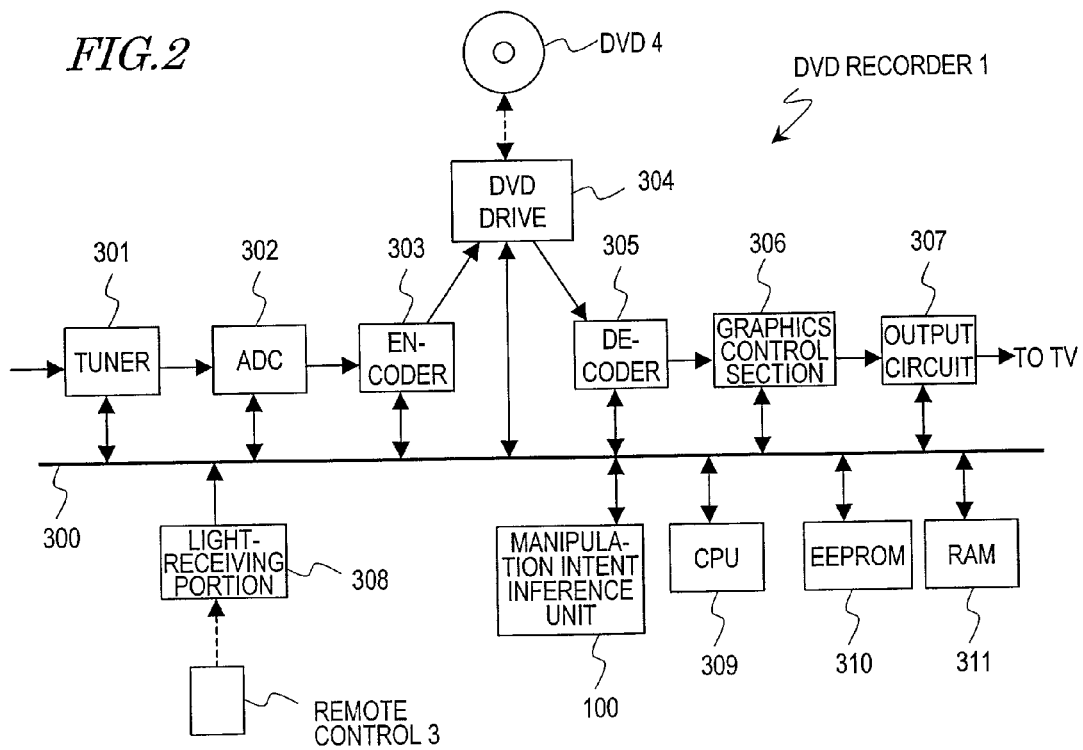
[FIG. 2] A diagram showing a hardware construction of the DVD recorder 1.

FIG. 2 shows a hardware construction of the DVD recorder 1. The DVD recorder 1 (hereinafter referred to as the "recorder 1") is capable of writing or reading arbitrary data to or from a DVD 4. Note that the DVD 4 may be a read-only disk, in which case the recorder 1 only performs data read. Note that the DVD recorder 1 may include a hard disk drive (HDD), in which case the DVD recorder 1 is capable of writing or reading arbitrary data to or from the hard disk.

The recorder 1 includes a bus 300, a tuner 301, an AD converter 302, an encoder 303, a DVD drive 304, a decoder 305, a graphics control section 306, an output circuit 307, a light-receiving portion 308, a CPU 309, an EEPROM 310, an RAM 311, and the inference unit 100.

Hereinafter, the functions of the respective component elements will be described. The bus 300 is a signal line. The bus 300 connects between the other component elements of the recorder 1 to transmit signals within the recorder 1.

The tuner 301 receives broadcast wave signals from an antenna (not shown), and extracts a signal of a necessary program by performing a tuning based on frequency. The AD converter 302 subjects the signal from the tuner 301 to digital conversion, and supplies it to the encoder 303. Upon receiving an instruction to start recording, the encoder 303 subjects the supplied digital data to compression encoding in MPEG-2 format, for example, and outputs it as encoded data.

The DVD drive 304 includes, for example, a disk tray, an optical head, a spindle motor, a rotation axis for transmitting the rotation of the spindle motor to a disk, a controller for controlling the operation of the entire drive, and the like (none of which is shown). Upon receiving an instruction to start recording, the DVD drive 304 writes the encoded data to the DVD 4. Upon receiving an instruction to start playback, it reads the encoded data that is written to the DVD 4.

Upon receiving an instruction to start playback, the decoder 305 expands the encoded data that has been read by the DVD drive 304, converts it to video or audio uncompressed data, and supplies it to the graphics control section 306.

The graphics control section 306 superposes video data from within an internal memory (not shown) onto uncompressed video data, thus realizing an On Screen Display (OSD) function. Moreover, based on the received manipulation confirmation information, the graphics control section 306 outputs image signals for displaying predetermined messages and screens. For example, when a particular user has pressed a predetermined button, the graphics control section 306 may output a video signal that contains a manipulation explanation, or an image signal (digital baseband signal) in which a varying menu image and video are merged. The output circuit 307 subjects the input digital image signal/audio signal to analog conversion for output. The output destination may be the TV 2, for example.

The light-receiving portion 308 receives infrared light from the remote control 3, and sends an instruction based on the user's manipulation, e.g., an instruction to start/stop recording, or start/stop playback of a recorded program, to the CPU 309 and the inference unit 100 via the bus 300.

The CPU 309 is a central control unit which controls the overall operation of the recorder 1. By utilizing the EEPROM 310 and the RAM 311, the CPU 309 controls the overall process including signal flows within the recorder 1. By reading and executing a program stored in the EEPROM 310, the CPU 309 generates control signals for realizing a process based on the program, and outputs them to the respective component elements via the CPU bus 300.

The EEPROM 310 is a non-volatile memory which is electrically rewritable, and stores software programs for controlling the recorder 1. Various flowcharts included in the attached drawings and concerning the descriptions of the embodiments are each implemented as a software program. Note that the EEPROM 310 may store software programs to be executed by a CPU (described later) in the inference unit 100 described later.

The RAM 311 has a work area for storing data which is necessary for the CPU 309 to execute programs. For example, by using the CPU bus 300, the CPU 309 reads a program from the EEPROM 310 into the RAM 311, and executes the program.

Note that computer programs are distributed on the market in recorded forms on storage media such as CD-ROMs, or transmitted via telecommunication lines such as the Internet. Thus, a computer system which is constructed by using a PC or the like may be allowed to operate as an electronic device having functions similar to those of the recorder 1 of the present embodiment, or operate as an apparatus having functions similar to those of the inference unit 100.

The inference unit 100 is implemented as a board on which one integrated circuit or a plurality of integrated circuits are mounted. The following descriptions assume that the inference unit 100 is implemented as a board on which one integrated circuit is mounted.

Hereinafter, an embodiment of the inference unit 100 of the present invention when implemented in the recorder 1 will be described.

4. First Embodiment of an Intended-Function Inference Unit According to the Present Invention First, the construction of the inference unit 100 of the present embodiment will be described with reference to FIG. 3. Next, an outline of the operation of the inference unit 100 will be described with reference to FIGS. 4 and 5. Thereafter, the respective component elements of the inference unit 100 will be described in detail.

4-1. Construction of the Intended-Function Inference Unit

Figure 3:
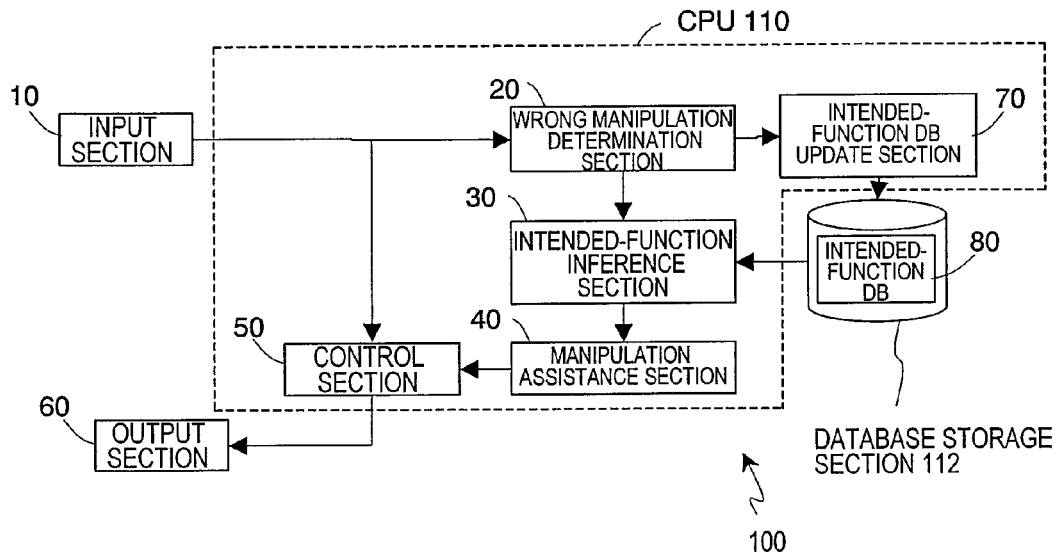
[FIG. 3] A diagram showing a functional block construction of an inference unit 100 according to a first embodiment.

FIG. 3 shows a functional block construction of the inference unit 100 of the present embodiment. The inference unit 100 includes an input section 10, a CPU 110, a database storage section 112, and an output section 60.

The input section 10 connects the inference unit 100 to the bus 300 of the recorder 1. Furthermore, the input section 10 acquires information specifying an input manipulation by the user as received by the recorder 1.

An input manipulation is a manipulation which is made to the recorder 1 by use of the remote control 3, or any input device such as a mouse, a keyboard, a button (not shown) on the main housing of the recorder 1. Selecting an icon by using GUI and a cursor also constitutes an input manipulation. For example, an input signal as to which button on the remote control has been pressed or which menu item in the GUI has been selected is acquired at the input section 10.

The CPU 110 controls the operation of the inference unit 100. Although the following descriptions assume that the CPU 110 is a separate integrated circuit from the CPU 309 of the recorder 1, this is only exemplary. As the CPU 309 of the recorder 1 executes the computer program in the place of the CPU 110, each function of the CPU 110 described later can be realized by using the CPU 309 alone. In this case, the database storage section 112 may further be composed of the EEPROM 310, thus resulting in a software implementation of the inference unit 100. There is no need for any individual board, circuitry, or other hardware for the information providing unit 100.

Hereinafter, the detailed construction of the CPU 110 will be described. The CPU 110 includes a wrong manipulation determination section 20, an intended-function inference section 30, a manipulation assistance section 40, a control section 50, and an intended-function DB update section 70. This means that, when the CPU 110 is seen from functional perspective, the CPU 110 operates as each component element. By operating in accordance with the procedure of the executed computer program, the CPU 110 functions as such a component element.

The wrong manipulation determination section 20 (hereinafter referred to as the "determination section 20") determines whether the content of an input from the input section 10 is a manipulation for the device or is an input indicating that a previously-input manipulation was a wrong manipulation.

The intended-function inference section 30 (hereinafter referred to as the "inference section 30") receives the result of determination by the determination section 20, and infers the intended function. In the present specification, an "intended function" is defined as a function which the user originally wanted to execute but for which a wrong manipulation was performed. In the case where the user has pressed a wrong button when trying to execute a function which was originally meant to be executed, the inference section 30 infers the intended function.

The manipulation assistance section 40 determines the substance of manipulation assistance concerning the intended function which has been inferred by the inference section 30, and generates manipulation assistance information, such as a message to be displayed for providing manipulation assistance. Manipulation assistance may be, for example: after displaying a summary of the intended function and obtaining confirmation, executing the function; presenting an explanation of a proper manipulation method for the intended function; or explaining a difference between the manipulation methods for the function which will be executed by the wrong manipulation and the intended function.

The control section 50 gives an instruction to execute a function corresponding to the content which is input at the input section 10. Moreover, in the case where a given manipulation is determined as wrong, if the substance of manipulation assistance has been determined in the manipulation assistance section 40, the control section 50 outputs manipulation assistance information to the DVD recorder 1, and outputs an instruction to the DVD recorder 1 to operate based on the substance of manipulation assistance. As a result of this, the usual operation and the manipulation assistance operation can be treated in an integral manner.

If the user is being able to perform a proper manipulation when executing a function, the intended-function DB update section 70 (hereinafter the "update section 70") assumes that the user properly understands the substance of that function as well as its manipulation method, and modifies a subsequently-described intended-function database (DB) 80 corresponding to that manipulation. As a result, it becomes possible to maintain intended-function candidates which reflect the substance of manipulations which users with various knowledge and skill perform according to their knowledge, whereby the accuracy of intended-function inference is improved.

Next, the database storage section 112 and the output section 60 of the inference unit 100 will be described.

The database storage section 112 stores the intended-function database (DB) 80. The intended-function DB 80 is a table in which functions of the electronic device are associated with highly-mistakable manipulations to the user, such as that shown in FIG. 7. Highly-mistakable manipulations to the user are determined with respect to each button on the remote control 3, for example. With each button which was manipulated but was wrong (wrong manipulation button), one or more functions of the electronic device are associated. As will be described later, the association between each wrong manipulation button and functions of the electronic device will be referred to as an "intended-function candidate list". It may be said that the intended-function DB 80 is a collection of a plurality of intended-function candidate lists.

By using the intended-function DB 80, when the user has made a manipulation mistake, candidates (intended-function candidates) as to which functions may originally have been meant to be executed can be extracted. By referring to this database, intended function(s) can be inferred with a level of accuracy at that point in time. By updating this database, the accuracy of inference for the intended function can be improved. The method of updating the database will be described later.

The output section 60 receives instructions and manipulation assistance information which are output from the control section 50, and outputs them as predetermined signals. Based on the signals, the DVD recorder 1 outputs an operation result of the DVD recorder 1 to an output device. The output device may include the TV 2 for displaying icons or menu indications, loudspeakers for outputting an audio response, and the like. The output device is determined corresponding to the function to be provided by the DVD recorder 1.

4-2. Operation of the Intended-Function Inference Unit

Figure 4:
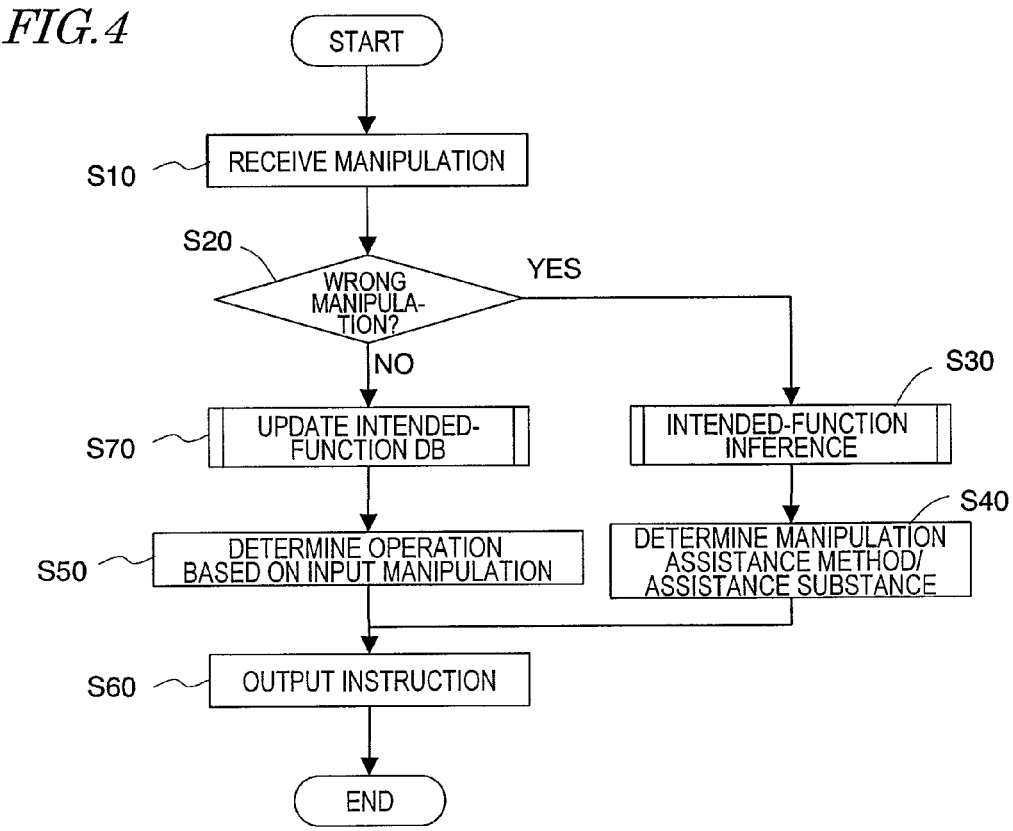
[FIG. 4] A flowchart showing a procedure of processing by the inference unit 100 according to the first embodiment.
Figure 5:
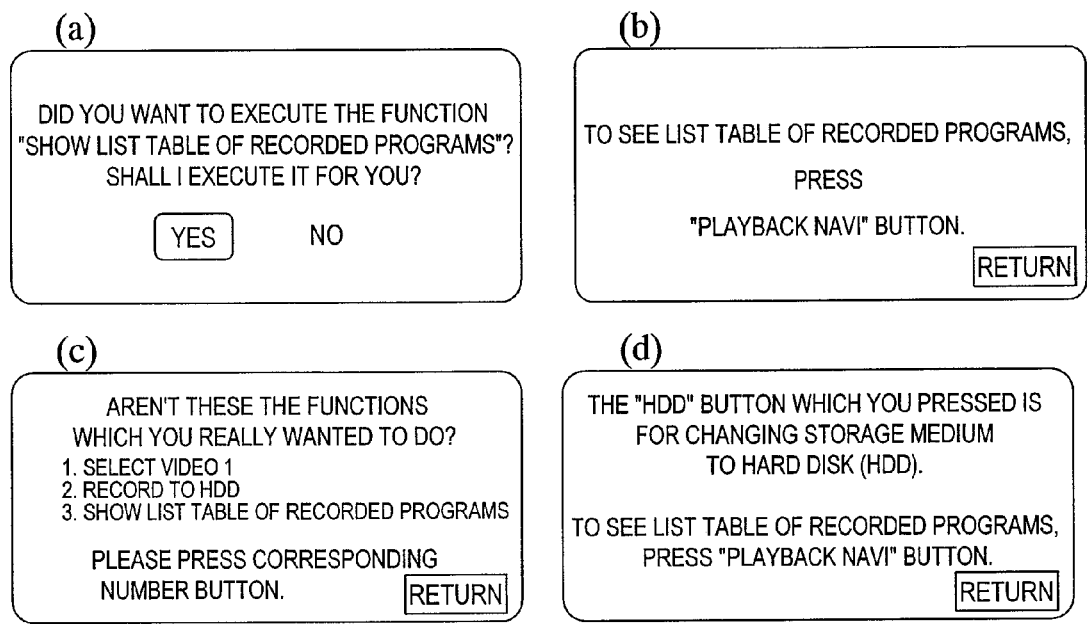
[FIG. 5] (*a*) to (*d*) are diagrams showing exemplary displayed images of messages of manipulation assistance substance.

FIG. 4 shows a procedure of processing by the inference unit 100.

First, at the first step S10, the input section 10 receives a manipulation from the user, and acquires information specifying that manipulation.

There are generally two types of manipulations. One is a manipulation of instructing a function to be executed, and the other is a manipulation of indicating, after performing a manipulation of instructing a function to be executed, that an operation conforming to the user's intent was not carried out (or it was not the intended function). Examples of the former are input manipulations for instructing the DVD recorder 1 to "play", "stop", etc., for example. Examples of the latter are manipulations for nullifying a previous function-executing manipulation, e.g., "return" and "cancel", and input manipulations to be performed when the meaning of a previously executed function is unclear, e.g., "view help".

At the next step S20, the determination section 20 determines whether the manipulation received at step S10 is indicative of a wrong manipulation or not. If the received manipulation is not indicative of a wrong manipulation, e.g., if it instructs a function to be executed, the determination section 20 determines that there was no wrong manipulation, and the process proceeds to step S70.

On the other hand, if the received manipulation is indicative of a wrong manipulation, as in the case of a pressing of the "return" button or the "cancel" button, the determination section 20 determines that there was a wrong manipulation, and the process proceeds to step S30. This determination of a wrong manipulation indicates that a function-executing manipulation which was performed prior to (e.g., immediately before) a pressing of the "return" button was wrong.

At step S70, the update section 70 modifies the intended-function candidate lists in the intended-function DB 80 based on the function name of an immediately previous manipulation. It implies that the user has properly performed a button manipulation based on correct knowledge and consequently his or her desired function is being executed (or is about to be executed) when the process of step S70 is performed. Therefore, the intended-function candidate lists, which should define highly-mistakable manipulations to the user, are modified so that the intended-function candidate lists reflect this fact. Detailed description of the method of modification will be set forth later.

At the next step S50, the control section 50 determines the substance of an operation to be executed based on the input manipulation. For example, when the "play" button is pressed, it is determined to read video/audio data from the DVD 4 or the HDD (not shown), etc., and to sequentially output video/audio from the TV 2 based on the data having been read. When the "stop" button is pressed, it is determined to stop the data read that has been continued up to that point, and to stop outputting of video/audio from the TV 2.

Then, at step S60, the control section 50 outputs an instruction corresponding to that determination. More specifically, the control section 50 generates a signal representing an instruction corresponding to the determination, and sends it to the CPU 309 of the DVD recorder 1 via the output section 60. As a result, video may be played back on the TV 2, and audio may be output from the loudspeakers thereof. Note that, in the case of presenting information in audio form, for example, the device operation and the presentation of the substance of manipulation assistance (described next) may both be provided in audio form. Since the present invention is also applicable to devices other than the DVD recorder 1, the output section 60 may output an instruction signal in any manner suitable to the functions possessed by that device.

At step S30, the inference section 30 infers the intended function, which means what the user really wanted to execute. From the process of step S20, the manipulation received at step S10 indicates that a function-executing manipulation which was performed prior thereto was wrong. Accordingly, the inference section 30 refers to the intended-function DB 80 by using as a key the button name of the wrong manipulation button which was identified to be a wrong manipulation, and reads from the highest-ranking entry of the intended-function candidate list in descending order.

At step S40, the manipulation assistance section 40 determines a manipulation assistance method and a manipulation assistance substance with respect to the intended function which has been inferred at step S30. Specifically, this process is performed in the manipulation assistance section 40, whereby the substance of the function which was originally meant to be executed may be displayed, and after obtaining confirmation, the function may be executed in the place of the user; a proper manipulation method may be explained with respect to the function which was originally meant to be executed; or a difference between the manipulation methods for the function which was originally meant to be executed and the function of the present wrong manipulation may be explained.

Thereafter, control proceeds to step S60, and as was described earlier, the control section 50 outputs an instruction corresponding to that determination.

Now, specific examples of manipulation assistance substance will be described with reference to FIGS. 5(a) to (d). FIGS. 5(a) to (d) show exemplary displayed images of messages of manipulation assistance substance.

In the exemplary displayed image of FIG. 5(a), according to the determination by the manipulation assistance section 40, an inquiry is made to the user as to a function that is inferred to be what the user wanted to execute, and the user is being asked to determine whether or not to execute the function.

In the exemplary displayed image of FIG. 5(b), an explanation of a manipulation method is being displayed according to the determination by the manipulation assistance section 40.

In FIG. 5(c), a plurality of candidates of functions which are inferred to be what the user wanted to execute are listed, and the user is being asked to decide which function to execute.

In FIG. 5(d), an explanation of a function corresponding to the user's manipulation and an explanation of a method for executing a function which is inferred to be what the user wanted to execute are being displayed.

By displaying messages as shown in FIGS. 5(a) to (d), various manipulation assistances can be provided to the user.

A situation in which such assistance may be provided will be described. Via an interface such as the remote control 3, a keyboard, a mouse, etc., the user performs a manipulation corresponding to a function which is meant to be executed, and operates the device. An example would be a pressing of the "play" button when viewing a desired content on the DVD recorder 1.

However, general users are not thoroughly acquainted with the manipulation methods for all of the functions of the DVD recorder 1, which has very many functions, and there are presumably at least a few instances of not knowing the manipulation methods for the functions to execute. Examples would be a manipulation for seeing a list table of TV programs that have been recorded by the DVD recorder 1, a manipulation for displaying the details of a program to be broadcast from 9 o'clock on Tuesday of the next week, and the like.

In this case, it is expected that the user, although not being sure about the manipulation, is going to perform some manipulation which the user believes to be the correct manipulation. This manipulation is what the user believes to be the correct manipulation, which may not be identical to the manipulation that the designer of the device has incorporated, but is presumably somewhat reasonable. Therefore, in the case of a wrong manipulation, based on manipulation results and the like of a plurality of users, it is possible to infer the function which the user originally intended and provide manipulation assistance for the user.

In the above example, if the user presses the "program guide" button in order to see a list table of TV programs that have been recorded, the DVD recorder 1 will first display a list table of TV programs that are planned to be broadcast in the future (i.e., a program guide). As a result, the user is able to know that the intended function is not being executed. In order to notify the DVD recorder 1 that the immediately previous manipulation to the device did not realize what was intended, the user will press the "return" or "cancel" button, for example.

Then, the inference unit 100 is able to recognize that the program guide which was displayed in accordance with the user's instruction is not the function which was really meant to be executed. Thus, an intended-function inference is performed by the inference unit 100, and with a message shown in FIG. 5(a) or the like, an explanation of a manipulation method for executing the intended function is displayed. As a result, even in the case where the user does not know the proper manipulation for executing the desired function, the user may perform a button manipulation which the user guesses to be proper, thus giving a notification of a wrong manipulation, whereby the user can easily execute and memorize that function.

Such manipulation assistance will not only be effective for children and the elderly who are not familiar with the device manipulations, but will also be effective until a person who is accustomed to the manipulations of a similar device becomes accustomed to the manipulations of the DVD recorder 1. Moreover, it will also be effective, in the case where a new function is added to the DVD recorder 1 through a version update or the like, until the user becomes proficient with that function.

Note that, a user of a conventional device before learning to perform a proper manipulation needs to look for a button for that function through trial-and-error pressing of buttons. Moreover, there will be many mistakes made before the proper substance is presented. It is impossible to infer an intended function immediately after a manipulation is performed for a function that is executed for the first time, unlike the inference unit 100.

Next, in accordance with the processing by the inference unit 100, the construction and/or operation of each component element will be described in detail. Hereinafter, with reference to FIG. 6, FIG. 7 and others, it will be first described how the intended-function DB 80 is generated and how it is constructed. Thereafter, the respective processes by the inference section 30 and the update section 70 will be described in detail.

4-3. Generating Method and Data Structure of the Intended-Function Database

In the intended-function DB 80, one or more intended-function candidates are stored concerning which manipulation was really meant to be executed, basically, when the user has performed a wrong manipulation. As the generation method therefor, a method based on experimentation, a method involving generation from the system of manipulations of the device etc., and the like are possible. It is assumed that the intended-function DB 80 is generated by the manufacturer of the DVD recorder 1, for example, and that initial values are assigned and stored at the shipment of the DVD recorder.

First, with reference to FIG. 6, it will be described how the intended-function DB 80 is generated based on experimental results. The initial intended-function DB 80 is generated by the manufacturer of the DVD recorder 1 following the procedure shown in FIG. 6.

Figure 6:
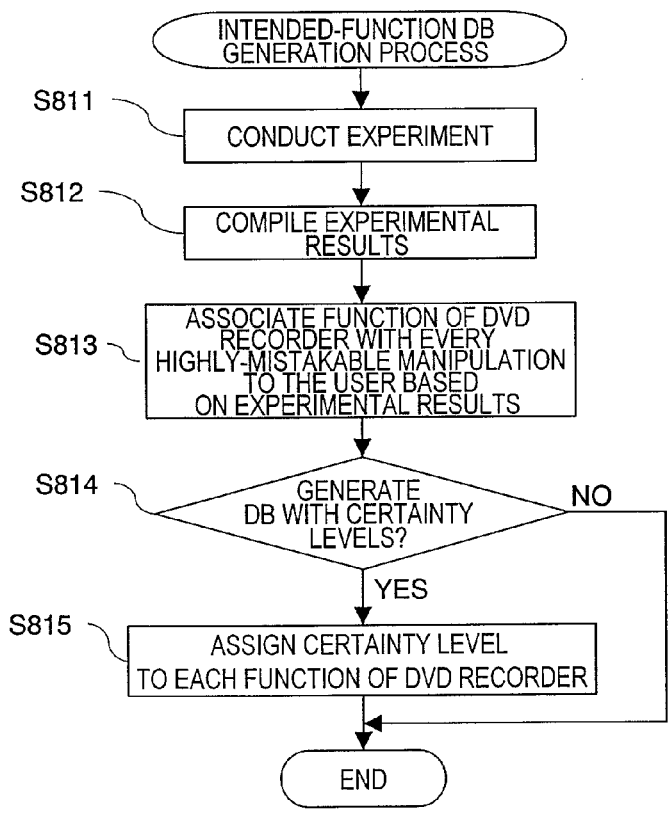
[FIG. 6] A flowchart showing a procedure of generating an intended-function DB 80.

FIG. 6 shows a procedure of generating the intended-function DB 80. First, at step S811, an experiment is carried out. The experiment involves giving instructions for users with various systems of knowledge to perform device manipulations, and observing which manipulations the users will perform to fulfill the instructions. One pseudo method of conferring different systems of knowledge to the examinees might be a method of allowing them to perform advance learning according to a flow shown in FIG. 25.

At step S812, the experimental results are compiled. Specifically, experimental results as shown in FIG. 28 are generated, which are obtained through the experiment. By referring to this table, it becomes possible to know which function a user was trying to execute when he or she made a manipulation mistake. According to this table, it is possible to infer which functions the user is likely to make manipulation mistakes about, and which button will be chosen by mistake.

At step S813, the experimental results obtained at step S812 (FIG. 28) are re-compiled so that each highly-mistakable manipulation to the user is mapped to functions of the DVD recorder 1. The reason for re-compiling the experimental results shown in FIG. 28 is that these experimental results indicate the wrong manipulations from the perspective of each function, and from these results alone it is difficult to infer, on the basis of what sort of wrong manipulation was made, a function the user was trying to execute.

FIG. 7 shows an exemplary data structure of an intended-function DB 80 which is obtained through re-compilation. In the intended-function DB 80, based on a key which is a button 81 that is regarded as a wrong manipulation in FIG. 28, one or more functions which the user was trying to execute when the button was pressed are placed in order as intended-function candidates 82. Detailed description concerning the intended-function DB 80 will be set forth later.

Referring back to FIG. 6, at step S814, it is determined whether the current intended-function DB 80 needs certainty levels or not. The "certainty level" is a parameter which is provided for each intended-function candidate, and indicates how close each intended-function candidate is to the function desired by the user who has pressed the wrong manipulation button. For example, the certainty level may take a numerical value in the range from 0 to 1.0, such that a greater numerical value means being closer to the function which the user originally wanted to execute.

It is an arbitrary choice of the designer of the intended-function DB as to whether or not to assign certainty levels. An intended-function DB in which no certainty levels are assigned will have a smaller amount of data than an intended-function DB in which certainty levels are assigned, but will be inferior in the accuracy of inference for the intended function. An intended function may initially be inferred by using an intended-function DB in which certainty levels are assigned, and the certainty levels may be removed when the intended-function DB is thereafter updated so that the number of candidates becomes equal to or less than a predetermined number.

If certainty levels are not to be assigned to the intended-function DB, the process is ended. The earlier-mentioned intended-function DB 80 in FIG. 7 is an example where no certainty levels are assigned.

On the other hand, if certainty levels are to be assigned to the intended-function DB, the process proceeds to step S815. At step S815, an intended-function DB 80 is generated in which a certainty level is assigned to each intended-function candidate (e.g., FIG. 12).

There are various possibilities as to how to assign certainty levels. For example, at the re-compilation of the experimental results, the intended-function candidates may be placed in descending order of the number of wrong manipulations observed for the functions, and certainty levels according to this order may be assigned. In the intended-function DB which is obtained with such a concept, ranks which are in accordance with the tendency of general users are set to the intended-function candidates. Therefore, the accuracy of inference for the intended function can be enhanced even if there is only a small manipulation history of the user. Alternatively, the initial values of all certainty levels may be set to 0.5.

As will be described later, as the user continues using the DVD recorder 1, the update section 70 (described later) will update the certainty levels. The intended-function candidates will be placed again in descending order of certainty levels, and function candidates according to their ranks will be presented to the user. Therefore, it is important to appropriately set and/or to appropriately update the certainty levels.

Through the above-described process, the intended-function DB 80 is obtained.

Now, the intended-function DB 80 shown in FIG. 7 will be described.

The intended-function DB 80 is in table format. The column 81 of wrong manipulation buttons represents a name of a button (wrong manipulation button) which was pressed in mistake by the user who tried to execute a desired function. The column 82 represents names of functions which the user wanted to execute when each wrong manipulation button was pressed.

For example, with respect to the topmost row 83 of the intended-function DB 80, when the play button was pressed by mistake, the function which the user wanted to execute is highly likely to be playback of a content on a DVD (play DVD), or playback of a content on an SD card (play SD). Herein, play DVD is the $1^{st}$ candidate, and the play SD is the $2^{nd}$ candidate.

As indicated by the row 83, the association between each wrong manipulation button 81 and intended-function candidates 82 of the DVD recorder 1 corresponding to that button will be referred to as an intended-function candidate list in the present specification.

There may be one or more intended-function candidates. For example, in FIG. 7, one row down from the row 83 indicates an intended-function candidate list in the case where the "HDD" button is the wrong manipulation button. In this list, "select Video 1" "record to HDD" "recording list", and the like are listed as candidates of functions which may originally have been meant to be executed.

The conceivable reasons why a plurality of intended-function candidates might be associated with one wrong manipulation button are: (1) there are more functions provided in the device than there are buttons provided on the remote control; (2) there exist buttons that do no make clear which function will be executed from those buttons (e.g. "HDD"); (3) there are buttons which serves as portals to GUI, e.g. "program guide", which make it difficult to identify the function that was really meant to be executed; and so on.

Therefore, if the intended-function DB is generated simply from the results of performing a manipulation experiment, a large number of intended-function candidates will be generated, which make it difficult to infer appropriate intended functions for users with various knowledge. Therefore, a process will be needed for updating the intended-function DB 80 with the update section 70, on the basis of the user's manipulation pattern, thus changing the intended-function candidates in the intended-function DB 80 to ranks which better suit the user's knowledge.

Note that the aforementioned generation method for the intended-function DB 80 is only exemplary. Other generation methods will be described later with reference to FIG. 17.

Next, an intended-function inference process by the inference section 30 (step S30 in FIG. 4) and an intended-function DB update process by the update section 70 (step S70 in FIG. 4) will be respectively described.

4-4. Inference Process for the Function Intended by the User

FIG. 8 shows a processing procedure by the inference section 30.

First, at step S31, the inference section 30 acquires information of a button which is determined by the determination section 20 as a wrong manipulation. For example, if a wrong manipulation is determined based on a pressing of the cancel button, the inference section 30 acquires the information of the button which was pressed immediately before the cancel button because it is likely that the manipulation which was performed immediately before the pressing of the cancel button was wrong.

At step S32, the inference section 30 acquires from the intended-function DB 80 an intended-function candidate list corresponding to the wrong manipulation button acquired at step S31. Specifically, the inference section 30 first detects, within the wrong manipulation button column 81 of the intended-function DB 80, those which match the wrong manipulation button acquired at step S31. If there is a match, intended-function candidates are acquired from its column 82 of intended-function candidates. It is assumed that one or more functions are contained in the intended-function candidate list. In the case where the intended-function DB 80 cannot be appropriately prepared in advance, all of the functions possessed by the device may be regarded as intended-function candidates. In the case where all of the functions possessed by the device are regarded as intended-function candidates, the accuracy of inference for the intended function will be gradually improved, based on the user's lineage of manipulations, through the intended-function DB update process (step S70 in FIG. 4).

At step S33, from among the intended-function candidates, the inference section 30 determines a function which is inferred to be what the current user wanted to execute. Specifically, among the function candidates in the intended-function candidate list corresponding to the wrong manipulation button, the inference section 30 adopts as the intended function the function candidate which is ranked $1^{st}$. After the user begins use of the DVD recorder 1, through the process by the update section 70 (described later), updates will be made so that a candidate which suits the current user will be at the highest rank in the intended-function candidate list. For this reason, simply the highest-ranking candidate is regarded as the intended function.

Through the above process, the inference section 30 is able to identify the function which the user wanted to execute as the intended function.

4-5. Update Processes of the Intended-Function Database by The Update Section 70

The intended-function DB update section 70 is able to update the intended-function DB 80 by one or more processing methods. Hereinafter, three kinds of processing methods will be described.

4-5-1. Update Process for the Intended-Function DB 80 (1)

First, with reference to FIG. 9 and FIG. 10, a first process by the update section 70 will be described.

Figure 9:
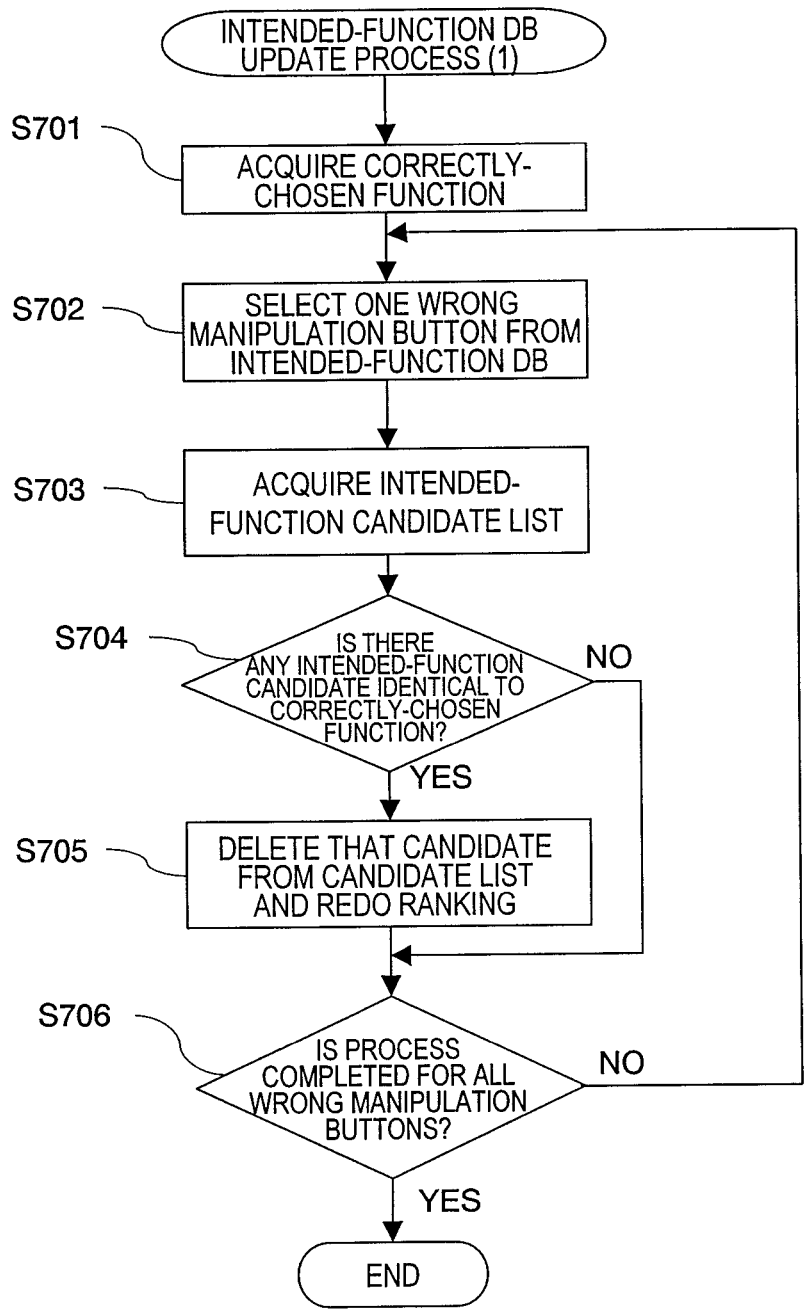
[FIG. 9] A flowchart showing a first processing procedure by an update section 70.
Figure 10:
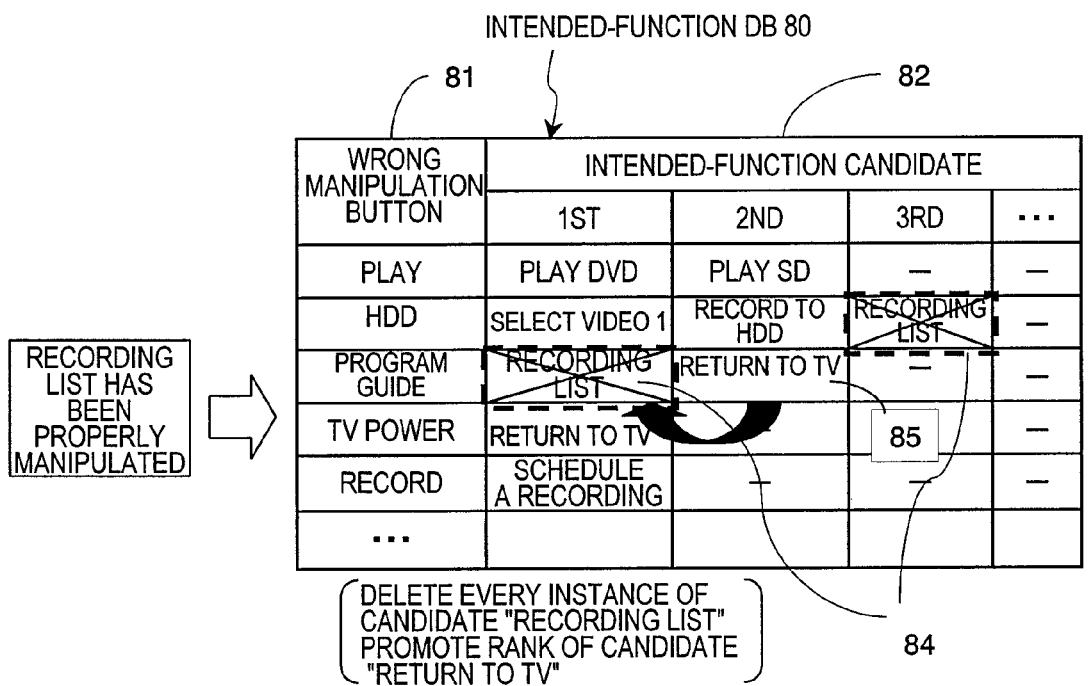
[FIG. 10] A diagram showing an example of updating the intended-function DB 80 when a "recording list" function has been executed by a proper manipulation.

FIG. 9 shows a first processing procedure by the update section 70. The purpose of the first process is to eliminate those functions which the user is capable of properly manipulating from the intended-function candidate lists. Since each intended-function candidate list is meant to be a list of candidates which are not known to be either properly manipulable by the user or not, it is considered that those functions which the user is able to properly manipulate should not be described in the intended-function DB. From this standpoint, the update section 70 updates the intended-function DB 80 according to the aforementioned purpose.

At step S701, the update section 70 receives from the determination section 20 a function which has been properly manipulated. This function will hereinafter be referred to as a correctly-chosen function. Considering that the user has the knowledge for properly manipulating this correctly-chosen function, the intended-function candidate lists in the intended-function DB 80 are modified according to the following process.

At step S702, the update section 70 selects one of the wrong manipulation buttons from within the wrong manipulation button column 81 of the intended-function DB 80. For example, a topmost one among the unprocessed buttons may be consecutively selected.

At step S703, the update section 70 acquires an intended-function candidate list corresponding to the selected wrong manipulation button. One or more intended-function candidates are contained.

At step S704, the update section 70 determines whether the same function as the correctly-chosen function received at step S701 is included in the intended-function candidate list acquired at step S703. If it is included in the intended-function candidate list, the process proceeds to step S705; if it is not included in the intended-function candidate list, the process proceeds to step S706.

At step S705, the update section 70 deletes the function candidate corresponding to the correctly-chosen function from the intended-function candidate list, and redo ranking. As a result, this intended-function candidate list in the intended-function DB 80 is rewritten.

At step S706, the update section 70 determines whether the process has been completed for all wrong manipulation buttons in the entire intended-function DB 80. If the process has been completed with respect to all of the buttons, the update process for the intended-function DB 80 is ended. If there is any unprocessed button, the process returns to step S702 and is repeated therefrom.

Now, with reference to FIG. 10, an example of updating the intended-function DB 80 according to the aforementioned first process will be described. FIG. 10 shows an example of updating the intended-function DB 80 when the "recording list" function has been executed with a proper manipulation. If the user has executed the "recording list" function with a proper manipulation, according to the process flow shown in FIG. 9, the "recording list" 84 will eventually be detected among all intended-function candidates 82 that are described in the intended-function DB 80, and deleted from the intended-function candidate lists.

For example, paying attention to the "program guide" among the wrong manipulation buttons 81, deletion of the $1^{st}$ function candidate, i.e., "recording list", promotes the $2^{nd}$ function 85, i.e., "return to TV", to the $1^{st}$. The intended-function candidate list for the "HDD" button, in which the "recording list" 84 is included, is also similarly modified. Note that, in the above example, "select Video 1", "record to HDD", and the like among the intended-function candidates 82 for the wrong manipulation button 81 "HDD" are yet to be confirmed as to whether they can be properly manipulated or not, and therefore are retained as they are.

Through such a process, every time a proper manipulation is performed, the intended-function candidates corresponding to a plurality of wrong manipulations within the intended-function DB 80 are modified. As correct manipulations are repeated, an intended-function DB 80 will be generated which enables a more proper inference of an intended function when the user has performed a wrong manipulation.

Previously, the method for determining a properly-manipulated function relies on a single instance of manipulation. Note however that, in order to guarantee that the user properly understands the manipulation method for that function, the user may be determined as having correct knowledge only after he or she has properly manipulated that function a plurality of times. In this case, a memory for memorizing which function has been properly manipulated how many times will be required, and the process shown in FIG. 9 may be activated when proper manipulations have occurred a certain number of times, e.g., three times or more.

4-5-2. Update Process for the Intended-Function DB 80 (2)

With reference to FIG. 11 to FIG. 14, a second process by the update section 70 will be described. In the second process, an intended-function DB 80 in which "certainty levels" are assigned is utilized, which has been described in connection with FIG. 6 above. In other words, the second process is applicable in the case where "certainty levels" are included in the intended-function DB 80.

The purpose of the second process is not to delete any intended-function candidates corresponding to a correctly-chosen function from the intended-function DB 80, but to change the numerical values of certainty levels. By adjusting certainty levels with respect to not only the correctly-chosen functions but also any intended function which the user has not actually manipulated but which is considered likely to be properly manipulated, it may be said that the intended-function DB 80 can be updated more efficiently.

Figure 11:
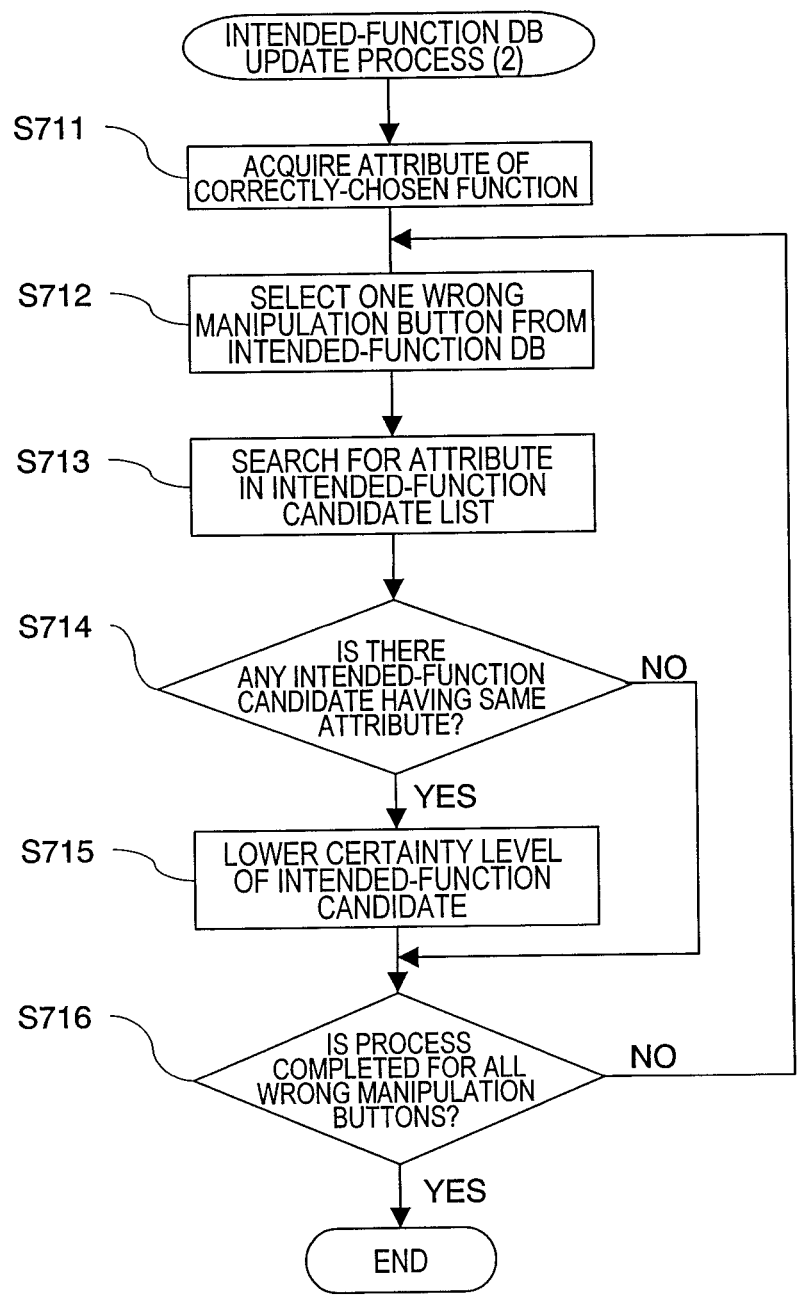
[FIG. 11] A flowchart showing a second processing procedure by the update section 70.
Figure 14:
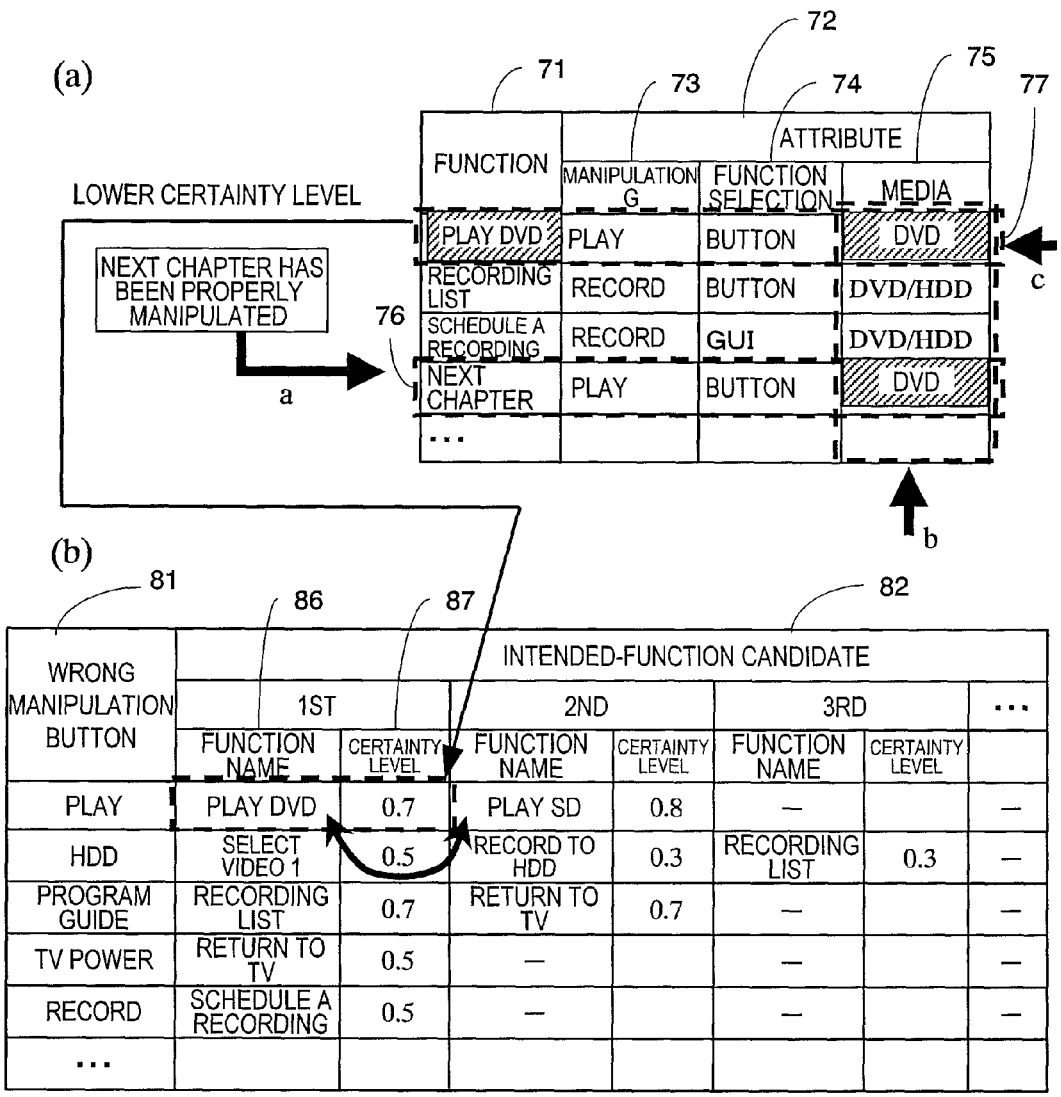
[FIGS. 14] (*a*) and (*b*) are diagrams showing an example of updating the intended-function DB 80 based on the second process by the update section 70.

FIG. 11 shows a second processing procedure by the update section 70. FIG. 12 shows an exemplary data structure of an intended-function DB 80 with certainty levels. FIG. 13 shows an attribute list of functions related to the second process. Prior to describing the second procedure of processing, the principles of the second process will be described.

First, FIG. 12 will be referred to. One difference from the intended-function DB 80 shown in FIG. 7 is that each intended function in the intended-function candidate list described in the column 82 is expressed as a set of a function name 86, which is information representing the intended function, and a certainty level 87. As was described earlier, the certainty level indicates, when a given wrong manipulation button 81 is pressed, how close each intended-function candidate is to the user's intended function.

In the column of wrong manipulation buttons 81, the $1^{st}$ intended-function candidate "play DVD" corresponding to "play" has a certainty level of 0.9. This numerical value means that, when a pressing of the "play" button is wrong, the intended-function candidate "play DVD" shall be very close to the user's intended function. Therefore, the inference unit 100 can firmly infer that "play DVD" is the intended-function.

Moreover, in the column of wrong manipulation buttons 81, the $1^{st}$ intended-function candidate "select Video 1" corresponding to "HDD" has a certainty level of 0.5. If a pressing of the "play" button is wrong, the intended-function candidate shall be "select Video 1", but in relation to the user's intended function, this candidate will not be as pertinent as the intended-function candidate "play DVD" in the aforementioned example.

Through such expressions based on certainty levels, it becomes possible to know how correctly intended functions will be inferred, even given the same rank. Therefore, if an increase or decrease in the certainty level of a certain function does not result in a change in ranking given the user's behavior, the user's knowledge can be specifically reflected in the intended-function DB 80.

Next, with reference to FIG. 13, attributes of functions will be described. First, the attributes of a function are characteristics of the function that can be classified based on criteria such as which manipulational category it relates to, how the function is selected, and what kind of storage medium the function relates to, for example. Each function of the DVD recorder 1 may be assigned with various attributes.

A column 71 in the attribute list of FIG. 13 is a list of functions that a device possesses. A column 72 shows various attributes of each function. Herein, manipulation group 73, method of selecting the function 74, and storage medium 75 are shown as examples of attributes.

The manipulation group 73 indicates an attribute as to whether it is a function related to playback of a content, a function related to recording, or a function related to data erase, for example. It is considered that checking this attribute makes it possible to determine how well a user understands notions such as playback and recording.

The method of selecting the function 74 indicates an attribute concerning the manipulation as to how that function is selected and executed. Even if the function is to be executed on the remote control, it is discerned as an attribute as to whether the execution of the function can be directly instructed with buttons such as "play" or "recording" provided on the remote control, or the function is executed via cursor key movements and the ENTER button. This relates to how accustomed the user is to the manipulations of the remote control itself.

Moreover, the storage medium 75 indicates an attribute as to the types of storage medium which are utilized for that function. For example, DVD media are utilized for the play DVD function, whereas both DVDs and the HDD may be utilized for the function of showing a recording list, because what is recorded on a DVD and what is recorded on the HDD may be similarly used. This relates to a level of accustomedness to the manipulations of that storage medium 75.

By thus classifying the attributes of each function, it can be seen that each function has attributes that are common to other functions. For example, in FIG. 13, the "play DVD" and "next chapter" functions have the "play" attribute with respect to the manipulation G73, whereas "play DVD", "recording list", and "next chapter" have the "button" attribute in common with respect to the attribute of method of selecting the function 74.

The inventors have considered that these function attributes can be utilized when applying the user's knowledge to an update of the intended-function DB 80 in relation to the user's manipulation. Specifically, the inventors have considered that, when a certain function is properly executed, it is likely that the user also properly understands each attribute pertaining to that function, which leads to the possibility that other functions sharing the common attributes will also be properly manipulated.

For example, it is presumable that a user who understands what is executed by the function of play DVD is also likely to understand the function of play HDD. This is an instance where the manipulation group 73 is commonly shared. Similarly, it is presumable that a user who can properly execute the next chapter is also likely to be able to properly execute other functions related to its DVD attribute.

Based on such common attributes, the update section 70 is able to update the certainty levels of the intended-function DB 80 with certainty levels. The second process shown in FIG. 11 is performed in order to update certainty levels based on the above-described principles.

At step S711 in FIG. 11, the update section 70 receives from the determination section 20 a function that has been properly manipulated, and acquires the attribute value of a predetermined attribute of that correctly-chosen function. Herein, the predetermined attribute refers to the manipulation group 73, storage medium 75, etc., in FIG. 13, and one such attribute is to be selected. In the case where there is a plurality of attributes to select from, the process from step S711 to step S716 may be repeated according to the number of attributes.

At step S712, the update section 70 selects one wrong manipulation button from within the wrong manipulation button column 81 in the intended-function DB 80. For example, a topmost one among the unprocessed buttons may be consecutively selected.

At step S713, the update section 70 acquires an intended-function candidate list corresponding to the selected wrong manipulation button. A plurality of intended-function candidates are contained.

At step S714, the update section 70 determines whether the attribute value of the predetermined attribute of the correctly-chosen function acquired at step S711 is identical to the attribute value of any function that is contained in the intended-function candidate list acquired at step S713. If the attribute values are identical, the process proceeds to step S715; if the attribute values are not identical, the process proceeds to step S716.

At step S715, the update section 70 decreases the certainty level of the identical intended function. The reason for decreasing the intended function is that, presumably, an intended-function candidate that has an identical attribute value to that of the correctly-chosen function is not likely to be the intended-function when a wrong manipulation has occurred. As a method of decreasing the certainty level of an intended-function candidate, a method of subtracting a pre-determined value (e.g. 0.05) therefrom, or a method of multiplying it by a predetermined value which is smaller than 1 (e.g. 0.95) would be possible, for example.

At step S716, the update section 70 determines whether the process has been completed with respect to all wrong manipulation buttons in the entire intended-function DB 80 or not. If the process has been completed with respect to all of the buttons, the intended-function DB update process is completed; if there is any unprocessed button, the process returns to step S712, and is similarly repeated therefrom.

FIGS. 14(a) and (b) show examples of updating the intended-function DB 80 based on the second process by the update section 70. As shown in FIG. 14(a), it is assumed that the "show next chapter" function has been properly manipulated, and that the attribute value of interest is storage medium.

First, in procedure a, the update section 70 refers to a "next chapter" row 76 in the function column 71 of the attribute list, and acquires the attribute "DVD" from the media column 75. In next procedure b, the update section 70 refers to the media column 75 to search for the common attribute DVD among the media attributes of the other functions. As a result, the attribute DVD is found in a column 77.

In last procedure c, the play DVD function is identified in the column 77, and if "play DVD" exists among the intended-function candidates in the intended-function DB 80, their certainty levels are decreased. FIG. 14(b) shows an intended-function DB 80 resulting after changing the certainty levels in the intended-function DB shown in FIG. 12. In the wrong manipulation button column 81, "play DVD" exists as the $1^{st}$ function candidate for the "play" button, and its certainty level has been decreased from the initial 0.9 to 0.7.

Since the certainty level of the $1^{st}$, play DVD, has been decreased to 0.7, the certainty level 0.8 of the $2^{nd}$, play SD, is now the largest. Accordingly, the update section 70 performs an update of swapping the $1^{st}$ and the $2^{nd}$. Thus, changing the certainty levels may result in changes in the ranks of intended-function candidates.

In the case performing updates by using a plurality of attributes, it would be possible to adjust the size of the value of decrease in certainty level depending on the nature of each attribute. That is, changes may be introduced depending on among how many functions each attribute and attribute value are shared, for example. Specifically, when paying attention to the degrees of overlap of the respective attributes of manipulation group 73 and method of selecting the function 74, regarding the manipulation group 73, there will be about several to ten functions having identical attributes such as playback or recording; on the other hand, regarding the method of selecting the function 74, there will be more functions encompassed by each attribute because the difference lies in whether it is executed with a button or it is selected and executed based on GUI. Therefore, the manipulation group 73 may be regarded as being more narrowed down, and thus suffer a greater rate of decrease in certainty level.

Note that, something like the difficulty level of each function might also be conceivable as an attribute. For example, playback and stop can be regarded as frequently-used functions having a low difficulty level, whereas ×1.3 playback, chapter skip, and the like may be regarded as not-so-well-known functions having a high difficulty level. In this case, distinctions may be made based on commonness in the difficulty level attribute, which would make it possible to, in a way, determine whether the user is a novice or an expert.

4-5-3. Update Process for the Intended-Function DB 80 (3)

Next, a third process by the intended-function DB update section 70 will be described. The third process also uses an intended-function DB 80 in which certainty levels are assigned (e.g., FIG. 12).

The third process takes into consideration the fact that, when the user has not executed a given function for a certain period of time or longer, the user may have forgotten the method for executing that function, and the certainty levels concerning that function are changed.

For example, in the case of a DVD recorder, functions which are seldom executed after being executed for the first time, e.g., clock setting and reception area setting to be performed at the time of purchase, may be forgotten, and a user who rarely executes the dubbing function or the like may forget its method. The aforementioned processing method which performs deletion from the intended-function DB 80 responsive to a proper execution cannot cope with such cases.

Figures 15, 16:
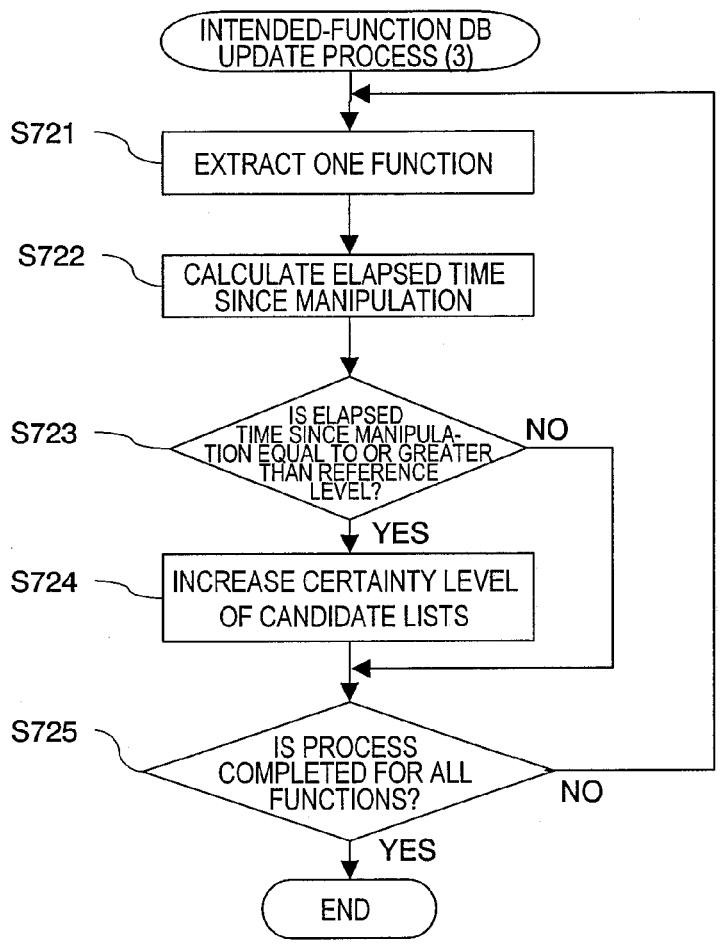
[FIG. 15] A flowchart showing a third processing procedure by the update section 70.
[FIG. 16] A diagram showing a table retaining a last-executed date/time of each function and an elapsed time since that date/time.

Hereinafter, with reference to FIG. 15 and FIG. 16, a third process by the update section 70 will be described. FIG. 15 shows a third processing procedure by the update section 70.

At step S721, the update section 70 extracts one from among all functions of the device on the intended-function DB 80. Thereafter, the process from steps S721 to S725 is repeated until the check is ended with respect to all of the functions.

At step S722, the update section 70 calculates an elapsed time up to the present time since that function was last executed. In order to calculate the elapsed time, the inference unit 100 retains a table (not shown) for retaining information concerning the date/time that each function was last executed.

Alternatively, the inference unit 100 may retain a table as shown in FIG. 16. FIG. 16 shows a table retaining a last-executed date/time of each function and an elapsed time since that date/time. With respect to each function shown in a column 71 of the table of FIG. 16, a point in time at which it was last manipulated is shown in a column 78. The elapsed time since this point in time of last manipulation can be obtained from calculating a difference from the current time. For example, the update section 70 performs this calculation with predetermined timing (e.g., in minutes), stores the result of the calculation to the column 79, and updates the old elapsed time. Note that, among the functions, some may not be used for a long time, e.g., "schedule a recording", and some may not give rise to an elapsed time because they have never been executed, e.g., "next chapter".

At step S723, the update section 70 determines whether or not the elapsed time since manipulation which has been calculated by the column 78 is equal to or greater than a predetermined reference time. If it is determined that the predetermined time or more has elapsed, the process proceeds to S724; if not, the process proceeds to step S725. The predetermined time is an amount of time over which the user may forget about that manipulation, e.g., one month or three months. It may be appropriately set according to the user's tendency as to being accustomed to or forgetting about manipulations.

At step S724, among the intended-function candidates which are described in the intended-function DB 80, the update section 70 increases the certainty levels of those corresponding to the function selected at step S721. As a method of increasing the certainty levels of the intended-function candidates, a method of adding a predetermined value (e.g. 0.05) thereto, or a method of multiplying it by a predetermined value which is greater than 1 (e.g. 1.05) would be possible, for example. Alternatively, a fixed value may be used in accordance with the elapsed time, e.g., elapsed period (in months)*0.1.

At step S725, the update section 70 determines whether the process has been completed with respect to all functions. If the process has been completed with respect to all buttons, the intended-function DB update process is completed; if there is any unprocessed button, the process returns to step S721, and is similarly repeated therefrom.

By increasing through such a process the certainty levels of the intended-function candidates for those functions which the user has not used for a long period of time, the functions which are not daily used can be placed among the higher ranks of intended-function candidates over the functions which are daily used, whereby the accuracy of inference upon a wrong manipulation is improved.

In the third process by the update section 70, an elapsed time since a function was last executed is calculated. Alternatively, it would also be possible to rely on how many times other functions have been executed since the function was last executed. As a result, since the user's frequency of using a device differs, the difference between a relatively infrequent user and a frequent user can be reflected.

Thus, the processing by the update section 70 may permit various methods. The basic concept is to assume the level of knowledge of a user when the user has properly executed a function, and thus perform a process for modifying the ranks of the intended-function candidates in the intended-function DB 80.

Note that there is no need to perform either one of the first to third processes by the intended-function DB update section described herein in an exclusive manner. It would also be possible to sequentially perform a combination of these process. As a result, the user's proper manipulation can be reflected on the update of ranking of intended-function candidates from various perspectives.

Figure 17:
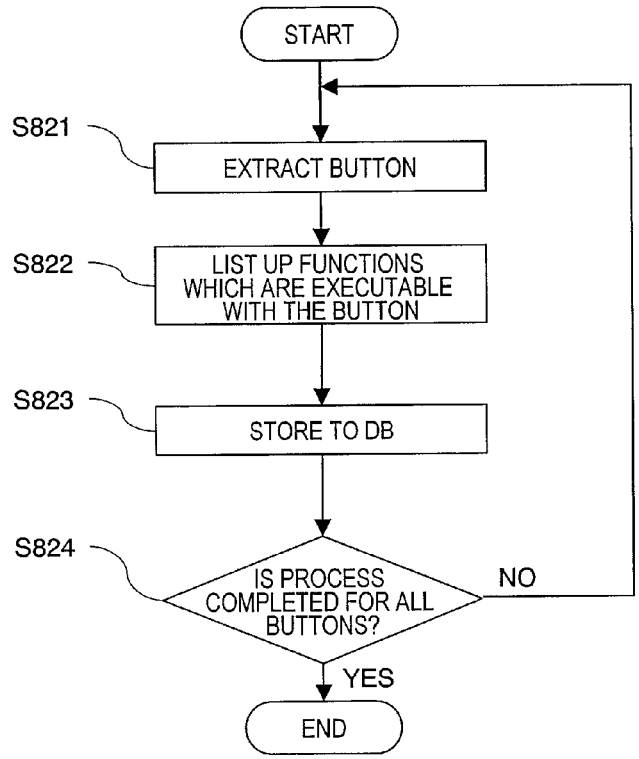
[FIG. 17] A flowchart showing a second procedure for generating the intended-function DB 80.

4-6. Another Generation Method and Data Structure for the Intended-Function Database FIG. 17 shows a second procedure for generating the intended-function DB 80. In this generation procedure, from an empirical fact that a button which often suffers from wrong manipulations is likely to have a plurality of functions assigned thereto, functions which are assigned to buttons are regarded as intended-function candidates.

At step S821, a button is extracted in a sequential manner. Thereafter, the process from steps S821 to S824 is repeated until there is no more manipulation button left on the device.

At step S822, those functions which are executable with the button extracted at step S821 are listed up. Functions which are executable with a button may include the following. In one instance, "play DVD", "play back a program on HDD", "play back the program under playback at a ×1.3 speed", and the like may be the functions which are executable with the "play" button. In another instance, a "red" button may have the function of "display tomorrow's program guide" on a screen of displaying a program guide, and may have the function of "switch to recording list of analog broadcasts" on a screen of recorded program listing. Once listed up, these candidates can be used as candidates of intended functions when a pressing of the same button really implies other functions.

At step S823, the list of functions which have been listed up at step S822 are stored to the intended-function DB 80 as intended-function candidates.

At step S824, it is determined whether the process has been completed with respect to all buttons. If the process has been completed with respect to all buttons, the intended-function DB generation process is completed; if there is any unprocessed button, the process returns to step S821, and is similarly repeated therefrom.

By using the intended-function DB 80 which has been generated with such a method, intended-function candidates are stored to the intended-function DB 80 with respect to any button for which different functions might be executed depending on the situation. Through combinations with the already-described processes by the intended-function DB update section 70, it becomes possible to ensure reflection of what sort of knowledge the user is basing his or her manipulation on, thus enabling a correct inference of the intended function.

With such a construction, the intended-function DB 80 for storing intended-function candidate lists as to which functions a user who has made manipulation mistakes may originally have wanted to execute is provided, and in the intended-function DB 80 and by means of the intended-function DB update section 70, the intended-function candidates to be used when the user has made a manipulation mistake can reflect the user's knowledge, based on a manipulation history of the user. As a result, as the user merely makes a correction for the button that was first pressed, the user can enjoy an execution of the function which the user wants to execute or an explanation of a manipulation method thereof, without directly designating the function which was originally meant to be executed.

The intended-function DB 80 which has been described hitherto is generated based on a plurality of users' tendency of wrong manipulations as ascertained through experimentation and the like, but may instead be generated by any other method not involving experimentation. For example, a designer at the manufacturer may list up intended-function candidates by conducting an advance analysis as to liability to mistakes.

5. Second Embodiment of an Intended-Function Inference Unit According to the Present Invention The manipulation intent inference unit according to Embodiment 1 realizes a manipulation assistance function for the user by being incorporated in a DVD recorder. This enables the user to enjoy manipulation assistance without being particularly conscious of the presence of the manipulation intent inference unit. In other words, in Embodiment 1, the intended-function DB 80 is merely being indirectly utilized by the user.

On the other hand, the manipulation intent inference unit according to the present embodiment is used by a user who recognizes its existence and manipulation assistance function, for searching for manipulation methods of functions in the manner of a dictionary. In other words, the intended-function DB 80 is subjected to direct use by the user according to the present embodiment.

For example, the user may not know a proper manipulation for executing a function to be executed, but performs a manipulation which the user believes to be proper for executing that function. Then, based on that manipulation, the manipulation intent inference unit of the present embodiment infers the function which the user wants to execute. That is, by performing some manipulation, the user is asking the manipulation intent inference apparatus to infer the function which the user really wants to execute. Thus, the user is able to search through the help function by the use of one button. Such manipulation assistance would be effective in the case where the user does not know a manipulation method for the function which the user really wants to execute, such that the function is too difficult to be found through a help of a directory-type or free text-inputting type, etc.

Hereinafter, with reference to FIG. 18 and FIG. 19, the construction and operation of a manipulation intent inference apparatus according to the present embodiment will be described.

Figure 18:
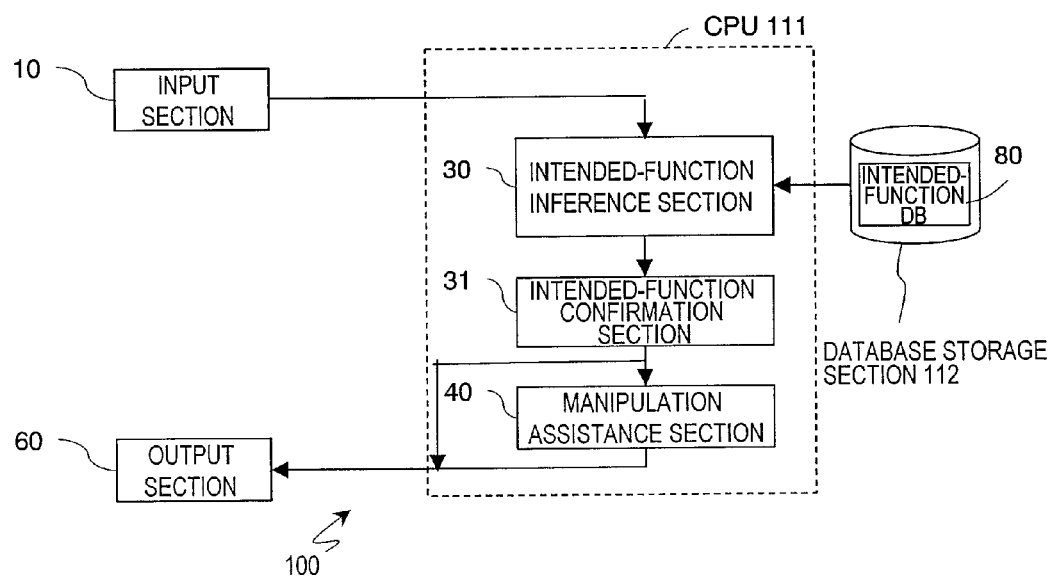
[FIG. 18] A diagram showing a functional block construction of the inference unit 100 according to a second embodiment.
Figure 19:
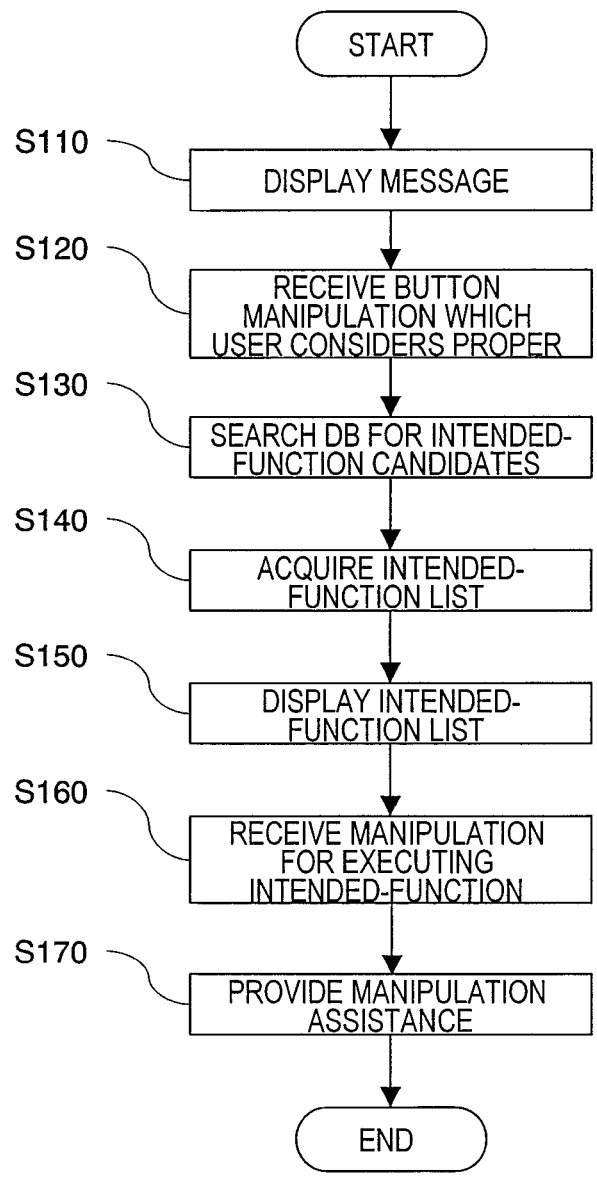
[FIG. 19] A flowchart showing a processing procedure by a manipulation intent inference apparatus according to the second embodiment.

FIG. 18 shows a functional block construction of the inference unit 100 of the present embodiment. The inference unit 100 includes an input section 10, a CPU 111, an output section 60, and a database storage section 112. The CPU 111 includes an inference section 30, an intended-function confirmation section 31, and a manipulation assistance section 40. The database storage section 112 stores an intended-function DB 80. Among these, component elements which have similar functions to those in the inference unit 100 of Embodiment 1 (FIG. 3) will be denoted with like reference numerals, and the descriptions in Embodiment 1 will be relied upon.

Note that, even regarding similar functions, if the methods used and the situations of use are different, such methods and situations will be described.

A manipulation which is received at the input section 10 is not a manipulation which the user considers to be proper, but is a manipulation which results from the user's contemplation as to which manipulation he or she would prefer, although not sure, in executing the function that the user wants to look up. Presumably this manipulation reflects a mental model which the user possesses for the function that is meant to be executed, and given that the intended-function DB adequately reflects the user's knowledge, this manipulation alone would enable an intent inference.

The inference section 30 acquires from the intended-function DB 80 an intended-function candidate with respect to the manipulation which has been input at the input section 10. Since intended-function candidates are stored at corresponding locations within the intended-function DB 80, a plurality of intended-function candidates may be acquired. Assuming that the intended-function DB 80 has been adequately updated by the intended-function DB update section 70 based on the user's manipulations up to then, the intended-function DB 80 may well be regarded as a DB in which intended-function candidates which reflect the user's knowledge are stored.

The intended-function confirmation section 31 (hereinafter referred to as the "confirmation section 31") presents to the user an intended-function candidate(s) which has been acquired by the inference section 30, asking the user to select a desired function. As a result, even in the presence of a plurality of intended-function candidates, the user is able to select an intended function.

The manipulation assistance section 40 determines a manipulation assistance regarding the intended function that has been selected at the confirmation section 31. As a result, similarly to Embodiment 1, a help or the like regarding an explanation of the function or a manipulation method for the function is prepared.

Next, with reference to FIG. 19, the processing by the manipulation intent inference apparatus of the present embodiment will be described. FIG. 19 shows a processing procedure by the manipulation intent inference apparatus of the present embodiment. This process is activated in response to a request from the user, e.g., a pressing of a "help search by intent inference" button, for example.

At step S110, the control section 50 causes the DVD recorder 1 to display a message. For example, the control section 50 causes the DVD recorder 1 to display a message such as "Please perform a manipulation which you believe proper for your desired function" or "Please press a button which you believe is right for executing your desired function".

At step S120, the input section 10 receives a manipulation from the user. This manipulation is a manipulation which has been considered to be proper and input by the user, who is not sure as to whether it is the proper manipulation or not.

Unlike in conventional help selection, e.g., keyword inputting or text-based inputting of a function to be executed, the user may simply press a button on the remote control or the like, or in the case of GUI or the like, select a menu item which he or she thinks is proper. With an input method which is easier than conventionally, the user is able to give an instruction for the function to be executed. This is also effective as a method for solving the problem of the DVD recorder 1 not being able to cope with an inputting of an expression or word which is unexpected to the DVD recorder 1 via the conventional text input or the like, or the problem of the user not being able to think of an appropriate keyword, etc.

At step S130, based on the received manipulation, the inference section 30 searches the intended-function DB 80 for intended-function candidates. Then, at step S140, the inference section 30 acquires an intended-function list.

At step S150, based on the intended-function candidate list acquired at step S140, the confirmation section 31 presents a message, and awaits a selection by the user. For example, the following message is presented: "This button is a button for executing XXX, but many people wanting to execute function A may also press this button by mistake. Do you want to execute function A? Or, many people also want to execute function B. Do you want to execute function B?". Then, at step S160, the input section 10 receives a manipulation for executing the intended function that has been selected by the user.

At step S170, the manipulation assistance section 40 determines a manipulation assistance for the intended function that has been selected at step S160, and prepares an explanation or the like for the user. Thereafter, the manipulation assistance substance is presented to the user via the output section 60.

Thus, manipulation assistance for the intend function is provided with a pressing of one button or a selection of one function by the user. As a result, a manipulation assistance apparatus which is easy for the user to use is provided.

6. Third Embodiment of an Intended-Function Inference Unit According to the Present Invention In the present embodiment, the intended-function inference unit has a communications function, and the intended-function DB 80 is updated based on external communications. This allows more new instances to be accumulated as compared to the intended-function DB 80 which was generated at the design phase. As a result, the likelihood for the user's intended function to be inferred more accurately is increased.

Moreover, the intent inference for the manipulation method of a DVD recorder, for example, may be susceptible to influences of other device manipulations. When watching a program that has been recorded with a mobile phone, which is a style that was not so prevalent at the design phase, has become sufficiently prevalent, for example, the contents of the intended-function DB 80 must also be updated. The intended-function inference unit of the present embodiment has a communications function, and can also cope with such a situation.

Hereinafter, with reference to FIG. 20 and FIG. 21, the construction and operation of the intended-function inference unit of the present embodiment will be described.

Figure 20:
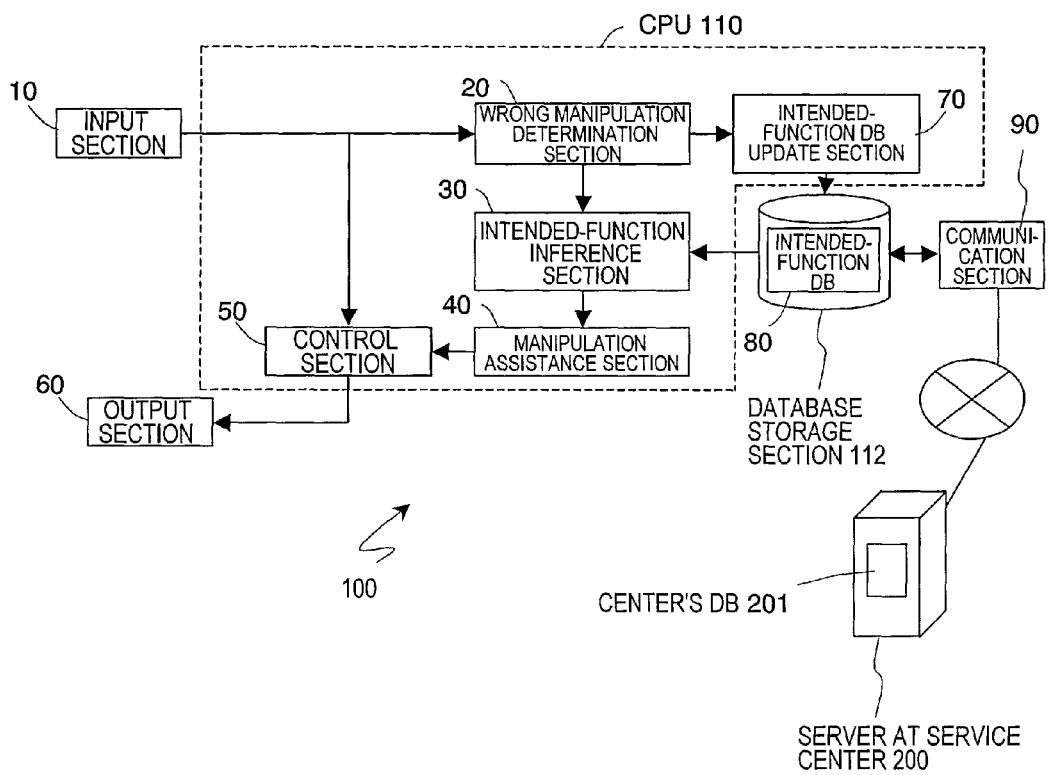
[FIG. 20] A diagram showing a functional block construction of an inference unit 100 according to a third embodiment.

FIG. 20 shows a functional block construction of the inference unit 100 of the present embodiment. The inference unit 100 includes an input section 10, a CPU 110, a database storage section 112, an output section 60, and a communication section 90. The CPU 110 includes a wrong manipulation determination section 20, an intended-function inference section 30, a manipulation assistance section 40, a control section 50, and an intended-function DB update section 70.

The inference unit 100 of the present embodiment differs from the inference unit of Embodiment 1 in that the communication section 90 is comprised. Component elements other than the communication section 90 have functions similar to those of the inference unit 100 of Embodiment 1 (FIG. 3), and thereafter are denoted with like reference numerals, and the descriptions in Embodiment 1 will be relied upon.

The communication section 90 performs communications with a server 200 which is connected via a network. The server 200 is disposed at a service center of the manufacturer of the DVD recorder 1, for example. The service center has a function of providing new information for each household, and instances of the intended-function DB 80 are accumulated in a central database (DB) 201 of the server 200.

From the server 200, the communication section 90 acquires a part or a whole of the intended-function DB which is necessary for an update, and thus is able to update the intended-function DB 80 within the database storage section 112. In Embodiments 1 and 2, the intended-function DB 80 is updated based on whether a user's manipulation is a wrong manipulation or not. In the present embodiment, the intended-function DB 80 is updated further based on data which is acquired from the server 200. With the communication section 90, the contents of the intended-function DB 80 become well-rounded, thus making it possible to generate intended-function candidate lists which are more suited to the user's knowledge.

Figure 21:
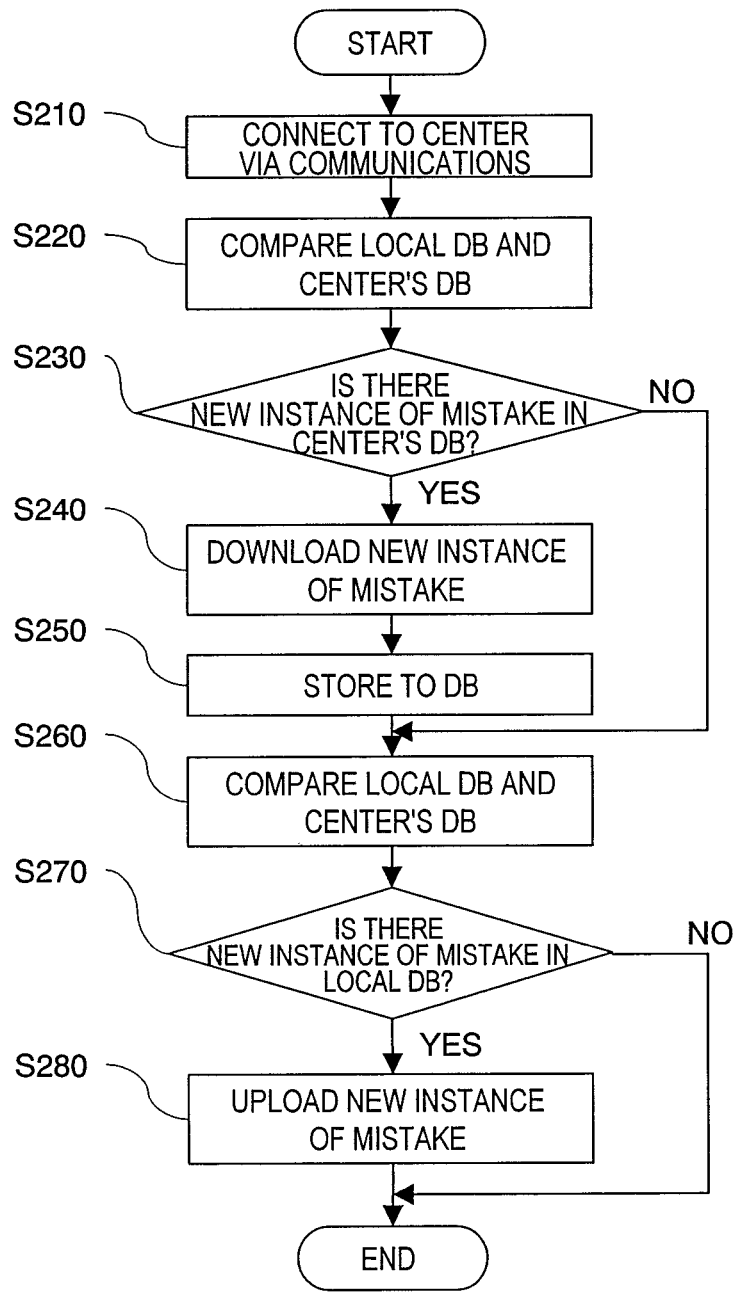
[FIG. 21] A flowchart showing a processing procedure by a communication section 90.

With reference to FIG. 21, processing by the communication section 90 will be described. FIG. 21 shows a processing procedure by the communication section 90.

At step S210, the communication section 90 communicates with the server 200 at the service center, and establishes connection with the server 200.

An intended-function DB 80 which is generated through experimentation strongly depends on the characteristics of the population of examinees. However, by providing the server 200 for collecting information on these intended-function candidates, it becomes possible to generate an intended-function DB 80 which reflects the characteristics of an actual group of users, or realize an update to an intended-function DB 80 which reflects such characteristics.

At step S220, the communication section 90 performs a comparison between the intended-function DB 80 (local DB) which is currently stored in the database storage section 112 and a center's DB 201 which is accumulated at the center.

At the next step S230, based on the result of comparison, the communication section 90 determines whether there exists any intended-function candidate that is not contained in the local DB 80 but is contained in the center's DB 201. If it is determined that any new instance (intended-function candidate) exists, the process proceeds to step S240; if it is determined that no new instances exist, the process proceeds to step S260.

At step S240, the communication section 90 downloads the new instance from the server 200, and at step S250, update the intended-function DB 80 in the database storage section 112 to store the instance. Thus, the new instance, which was added after the previous communication, can be accumulated in the intended-function DB 80. As a result of this, a wrong instance of another user having similar knowledge concerning manipulations to that of the user who is using the DVD recorder 1 is newly added.

At step S260, the communication section 90 performs a comparison between the local DB and the center's DB in a similar manner to step S220. At the next step S270, based on the result of comparison, the communication section 90 determines whether there exists any intended-function candidate that is not contained in the center's DB 201 but is contained in the local DB 80.

If it is determined that any new instance of an intended-function candidate exists, the process proceeds to step S280; if it is determined that no new instances exist, the process is ended.

At step S280, the new instance of an intended-function candidate that is contained only in the local DB is uploaded to the server 200. This uploaded instance will be a new instance to a user who is using the intended-function DB 80 at another household. Thus, mutual sharing of information progresses via the center's DB 201, thus reciprocally helping the contents of each intended-function DB to become well-rounded.

As more users connect to the server 200 at the service center, various more instances will be accumulated, thus leading to an increased likelihood that intended-function candidates from a user who performs manipulations with a system of knowledge which is similar to that of the user using the DVD recorder 1 are included. As a result, it becomes possible to provide an appropriate intended-function inference function even for a user who has a special system of knowledge that is hardly expectable to the designer.

7. Fourth Embodiment of an Intended-Function Inference Unit According to the Present Invention In the present embodiment, a manipulation intent inference unit will be illustrated which updates the intended-function DB 80 by inferring, based on a user's device manipulations, a model which the user was using prior to using the DVD recorder 1.

As has already been described, a user of the DVD recorder 1 has a tendency to make manipulation mistakes under the influence of a model which he or she was previously using. Therefore, by utilizing the experimental results shown in FIG. 28, it is possible to infer which model the current user was previously using, based on which button was pressed to result in a mistake. In the present embodiment, the intended-function inference unit 100 infers the model which the user was previously using, and updates the intended-function DB 80 based on such inference.

FIG. 22 shows an exemplary data structure of an intended-function DB 80 according to the present embodiment. In the intended-function DB 80 shown in FIG. 12, a certainty level is assigned to each function name of intended-function candidate 82. Instead of a certainty level, a model name 88 is assigned in the intended-function DB 80 of the present embodiment.

The model name 88 represents which specific model each intended-function candidate is related to. It is prepared based on the experimental knowledge that, even for the same question, the substance of each wrong manipulation may differ depending on the previously-learned model. In the example shown in FIG. 22, the experimental results shown in FIG. 28 are reflected.

Next, a method of updating the intended-function DB 80 will be described. FIG. 23 shows an example of updating the intended-function DB 80. To describe the method of updating, when the user has performed a wrong manipulation, the update section 70 determines whether a model which the user was previously using can be identified from that wrong manipulation or not. If the model which the user was previously using is identified, the update section 70 deletes any intended-function candidates 82 in the intended-function DB 80 to which model names other than that of the identified model are assigned.

Referring to FIG. 23, if the wrong manipulation is a pressing of the "recording" button, the intended function is inferred to be "schedule a recording", and the previously-used model can also be identified to be PSX.

Then, with respect to the other wrong manipulation buttons, the update section 70 deletes from the intended-function DB 80 those intended-function candidates for which the model name 88 is set to anything but PSX. The reason is that, since the user's model has been identified to be PSX, there is no need to take into consideration those intended-function candidates which are associated with any other models.

After the aforementioned update process is over, with respect to e.g. the wrong manipulation button "HDD", a plurality of intended-function candidates have been narrowed down to "recording list" alone. Therefore, when a pressing of the "HDD" button results in a wrong manipulation, the inference section 30 can infer the intended-function to be "recording list". After identification of the model, the intended-function candidates can be greatly reduced.

Thus, in the case where the intended-function DB 80 is generated based on experimental results, as shown in FIG. 22, and where it is possible to determine which model the user was previously using based on his or her lineage of wrong manipulations, the accuracy of inference for the user's intended function can be improved, whereby a prompt proper assistance can be realized.

In the above description, the intended-function inference unit 100 infers the user's intended function by determining which model the user was previously using. However, even without identifying a specific model, the intended-function inference unit is able to infer the user's intended function by other methods.

For example, the intended-function inference unit 100 may infer the user's intended function by identifying a device group to which that model belongs. This "device group" refers to a set of one or more devices as defined based on similarity in the system of manipulations. Generally speaking, each manufacturer of a DVD recorder has its own way of locating buttons on the remote control and assigning function names, etc., and therefore it is presumable that the system of manipulations of a DVD recorder would entirely differ from manufacturer to manufacturer. Conversely, between DVD recorders made by the same manufacturers, there is a lot of common ground in the system of manipulations even among different models, thus resulting in similar systems of manipulations. Therefore, based on classification of every devices having similar systems of manipulations, an experience of manipulating of a specific model can be regarded as identical to experiences of manipulating of all models belonging to the same device group.

Therefore, as devices sharing similar systems of manipulations, a set of models having a common manufacturer may be designated as one device group, such that a different device group is allocated to each manufacturer. The intended-function inference unit 100 is able to infer the user's intended function by identifying which device group the model previously used by the user belongs to, based on the user's lineage of wrong manipulations.

The method of implementing an intended-function DB 80 by utilizing device groups would be quite similar to the above-described example concerning models. For example, in FIG. 22 and FIG. 23, "model name" may read as "manufacturer name", for example, and the designations such as "E95H", "PSX", and "XS43" may be replaced by the respective manufacturer names, and thus the intended-function DB 80 may be constructed. By reading "model" as "device group", the respective procedures of the inference process by the inference section 30 and the update process by the update section 70 can be quite similarly explained.

One manufacturer may sell DVD recorders under a plurality of brand names. In such a case, device groups may be set under the assumption that different brand names result in different systems of manipulations.

Moreover, even among a plurality of models whose systems of manipulations differ for the large part, if there is commonness concerning the wrong manipulation buttons and functions that constitute the intended-function DB 80, such a plurality of models may be classified into the same device group.

In the case where there is only one device belonging to a device group, a specific model is being represented by the device group. Thus, the embodiment of utilizing device groups encompasses the aforementioned embodiment of identifying a model which was previously used by the user.

Note that each of the above embodiments illustrates that, before the user notifies the DVD recorder 1 that a previously-performed manipulation is a wrong manipulation, a function has already been executed by that manipulation. For example, when the "program guide" button is pressed, the function of displaying a program guide is executed by the pressing of the "program guide" button, and upon looking at the actually-displayed program guide screen, the user presses the "cancel" button to notify the DVD recorder 1 that the previously-performed manipulation is a wrong manipulation.

However, even before that function is actually executed, the user is able to notify the DVD recorder 1 that the previously-performed manipulation is a wrong manipulation. For example, DVD recorder 1 of the recent years displays, when the "delete" button for deleting data has been pressed, a prompt is displayed as to whether or not to really perform the deletion, before actually performing a deletion process. Therefore, when the prompt for deletion is given, the user is able to press the "cancel" button, the "return" button, or the like. As a result, in each of the above embodiments, the notification of a wrong manipulation does not need to be input after the manipulation has actually been carried into effect.

Furthermore, even in the case of a function for which no prompt is given, e.g., the "program guide" button, it would be possible to display a prompt screen when predetermined conditions are satisfied, so that the user is asked, before execution, as to whether it is a wrong manipulation or not.

For example, based on the manipulation experiences of a plurality of users, the information of wrong manipulations of functions (wrong manipulation patterns) of the device to be manipulated, i.e., the DVD recorder 1, may be defined into a plurality of types, and put into a database. Then, the database is referred to based on the user's manipulation history, and it is determined which wrong manipulation pattern the user matches. As a result, a wrong manipulation group can be inferred from the user's manipulation history alone. Since it is possible to determine the probability that a given manipulation is wrong by means of the inference of the wrong manipulation group, a manipulation prompt screen may be displayed if the probability is higher than a predetermined reference level. As a result, it becomes possible to provide a manipulation prompt concerning a manipulation for which the user is likely to perform a wrong manipulation.

After the user receiving this manipulation prompt presses the "cancel" button or the like, the inference unit 100 may perform a process according to the present embodiment described above, thus presenting intended-function candidates to the user.

INDUSTRIAL APPLICABILITY

A manipulation intent inference apparatus according to the present invention includes an intended-function database and an intended-function database update section, and when a wrong manipulation has occurred, infers a function which the user originally wanted to execute, according to the user's knowledge. It is useful as a manipulation assistance for devices which have a multitude of functions but which require that a selection be made from among limited buttons or limited menus, e.g., audio-visual devices such as a DVD recorder or a television, and an information communication terminal such as a mobile phone or a car navigation system. Since it is also applicable to the manipulation of a function which is selected within GUI, it is also applicable to the manipulation assistance for GUI manipulations of a device and to the manipulation assistance for a general-purpose information process device such as a personal computer or the like.

The invention claimed is:

1. An audiovisual device for recording and/or playing back audiovisual content comprising:
   an input section to receive a first manipulation and a second manipulation by a user and operating based on the manipulations, wherein the first manipulation is a manipulation to execute a function pertaining to manipulating the audiovisual content, and the second manipulation is an indication that the first manipulation is a wrong manipulation and is received by the input section subsequently to the first manipulation;
   a storage section which stores a pre-generated database in which candidate functions for manipulating the audiovisual content by the audiovisual device are associated with a wrong manipulation that is inferred to be highly mistakable when a first manipulation and a second manipulation are received by the input section;
   a manipulation assistance section for determining a substance of manipulation assistance for selecting one of the candidate functions when the received manipulation is inferred to be the highly mistakable manipulation in the database, the manipulation assistance section comprising:
      a determination section for determining the first manipulation is a wrong manipulation when the second manipulation is a predetermined manipulation expressing the first manipulation is wrong manipulation; and
      an intended function inference section for, when the first manipulation is determined to be a wrong manipulation by the determination section, inferring an intended function from among the candidate functions based on the first manipulation that is the wrong manipulation in the pre-generated database,
      wherein the substance of manipulation assistance is based on the first manipulation determined to be a wrong manipulation and the inferred intended function;
   an output section for outputting a signal for presenting manipulation assistance information for determining a function of the audiovisual device based on the substance of manipulation assistance; and
   a processing section that executes a function for manipulating the audiovisual content in accordance with a manipulation which is received in response to the presentation of the manipulation assistance information.

2. The audiovisual device of claim 1, further comprising an update section for updating the database depending on whether the first manipulation is determined to be a wrong manipulation or not.

3. The audiovisual device of claim 2, wherein, when the first manipulation is determined to be proper, the update section updates the database based on information of a function candidate which is identical to the function corresponding to the first manipulation.

4. The audiovisual device of claim 2, wherein,
   the database retains a set in which information of at least one function is associated with information of a device group concerning a model of the audiovisual device; and
   when the first manipulation is determined to be a wrong manipulation, the update section updates the database based on information of the model.

5. The audiovisual device of claim 4, further comprising an inference section for identifying the device group based on information of a device group of the set corresponding to the first manipulation determined to be a wrong manipulation.

6. The audiovisual device of claim 5, wherein,
the database retains a plurality of said sets; and
the update section deletes any set that does not contain information of the identified device group.

7. The audiovisual device of claim 4, wherein a plurality of said device groups are defined, each device group being defined based on a system of manipulations which is common to a plurality of models.

8. The audiovisual device of claim 4, wherein a plurality of said device groups are defined, each device group being defined based on a system of manipulations of one model.

9. The audiovisual device of claim 1, wherein the database retains a set in which information of at least one function is associated with a numerical value corresponding to the at least one function.

10. The audiovisual device of claim 9, further comprising an inference section for, when the first manipulation by the user is determined to be a wrong manipulation, selecting the at least one function based on the size of the numerical value, wherein,
in accordance with the at least one selected function, the manipulation assistance section determines the substance of manipulation assistance for executing the function which is intended by the user.

11. The audiovisual device of claim 9, wherein,
the database retains a plurality of sets in which information of a plurality of functions is associated with numerical values respectively corresponding to the plurality of functions; and
the numerical values are assigned in accordance with closeness between a function which is desired by the user who has performed the highly-mistakable manipulation and each of the plurality of functions.

12. The audiovisual device of claim 11, wherein,
at least one attribute is assigned in advance to each of the plurality of functions; and
when the first manipulation is proper, the update section searches the database based on an attribute of a first function that corresponds to the first manipulation, identifies a second function to which the same attribute is assigned, and changes the numerical value corresponding to the second function.

13. The audiovisual device of claim 1, wherein the database includes a play command as the wrong manipulation, and the candidate functions include at least one function for inferred intended playback of the audiovisual content.

14. The audiovisual device of claim 1, wherein the database includes a record command as the wrong manipulation, and the candidate functions include at least one function for inferred intended recording of the audiovisual content.

15. The audiovisual device of claim 1, wherein the database includes a storage device selection command as the wrong manipulation, and the candidate functions include at least one function for inferred intended manipulation of the selected storage device.

16. The audiovisual device of claim 1, wherein the database includes a program guide command as the wrong manipulation, and the candidate functions include at least one inferred intended function pertaining to accessing the audiovisual content.

* * * * *